(12) United States Patent
Meng et al.

(10) Patent No.: US 11,119,268 B2
(45) Date of Patent: Sep. 14, 2021

(54) DISPLAY APPARATUS, BACKLIGHT MODULE IN DISPLAY APPARATUS, AND METHOD OF DISPLAYING IMAGE

(71) Applicant: BOE Technology Group Co., Ltd., Beijing (CN)

(72) Inventors: Xiandong Meng, Beijing (CN); Jifeng Tan, Beijing (CN); Xianqin Meng, Beijing (CN); Qiuyu Ling, Beijing (CN); Wei Wang, Beijing (CN); Xiaochuan Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 67 days.

(21) Appl. No.: 16/638,446

(22) PCT Filed: Oct. 10, 2019

(86) PCT No.: PCT/CN2019/110410
§ 371 (c)(1),
(2) Date: Feb. 11, 2020

(87) PCT Pub. No.: WO2020/192082
PCT Pub. Date: Oct. 1, 2020

(65) Prior Publication Data
US 2021/0255384 A1 Aug. 19, 2021

(30) Foreign Application Priority Data
Mar. 27, 2019 (CN) .......................... 201910238545.9

(51) Int. Cl.
*G02F 1/1335* (2006.01)
*F21V 8/00* (2006.01)
(52) U.S. Cl.
CPC ......... *G02B 6/0055* (2013.01); *G02B 6/0053* (2013.01); *G02F 1/133512* (2013.01)

(58) Field of Classification Search
CPC .......... G02F 1/133512; G02F 2201/30; G02B 6/0053; G02B 6/0055; G02B 5/18
See application file for complete search history.

(56) References Cited

U.S. PATENT DOCUMENTS

2011/0090427 A1 4/2011 Ohue et al.
2011/0141395 A1* 6/2011 Yashiro ................ G02B 6/0036
349/62

(Continued)

FOREIGN PATENT DOCUMENTS

CN  108224240 A  6/2018
CN  108710240 A  10/2018
(Continued)

OTHER PUBLICATIONS

International Search Report & Written Opinion dated Dec. 30, 2019, regarding PCT/CN2019/110410.

(Continued)

*Primary Examiner* — Mariam Qureshi
(74) *Attorney, Agent, or Firm* — Intellectual Valley Law, P.C.

(57) ABSTRACT

A backlight module is provided. The backlight module includes a light guide plate; a plurality of reflective gratings on a first side of the light guide plate; and a plurality of reflectors on a second side of the light guide plate. A respective one of the plurality of reflective gratings is configured to diffract and reflect a portion of light totally reflected in the light guide plate into diffracted light transmitting across the light guide plate from the first side toward the second side. A portion of the diffracted light has a respective wavelength range to be received by a respective reflector. The respective one of the plurality of reflectors is configured to reflect the portion of the diffracted light having the respective wavelength range transmitting from the sec- (Continued)

ond side toward the first side to a position between the respective grating and an adjacent reflective grating.

19 Claims, 12 Drawing Sheets

(56) References Cited

U.S. PATENT DOCUMENTS

| | | | |
|---|---|---|---|
| 2012/0026429 A1* | 2/2012 | Chen | G02B 6/004 349/65 |
| 2018/0128958 A1* | 5/2018 | Niu | G02B 6/0053 |
| 2018/0149807 A1* | 5/2018 | Seo | G02B 6/005 |
| 2018/0188439 A1 | 7/2018 | Kim et al. | |

FOREIGN PATENT DOCUMENTS

| | | |
|---|---|---|
| CN | 109061948 A | 12/2018 |
| CN | 109188775 A | 1/2019 |
| CN | 109212834 A | 1/2019 |

OTHER PUBLICATIONS

First Office Action in the Chinese Patent Application No. 201910238545.9, dated Oct. 30, 2019; English translation attached.
Second Office Action in the Chinese Patent Application No. 201910238545.9, dated Jan. 16, 2020; English translation attached.

* cited by examiner

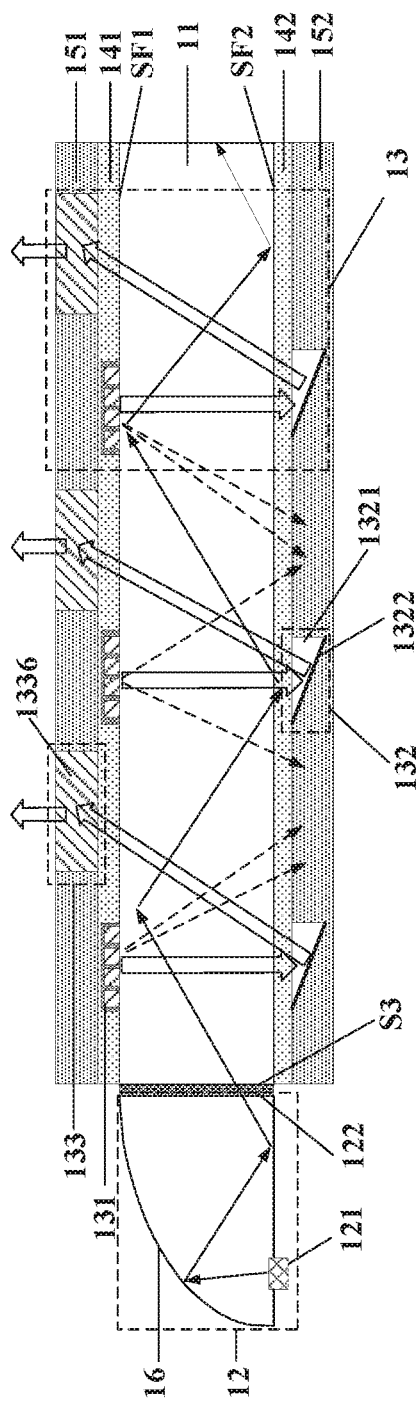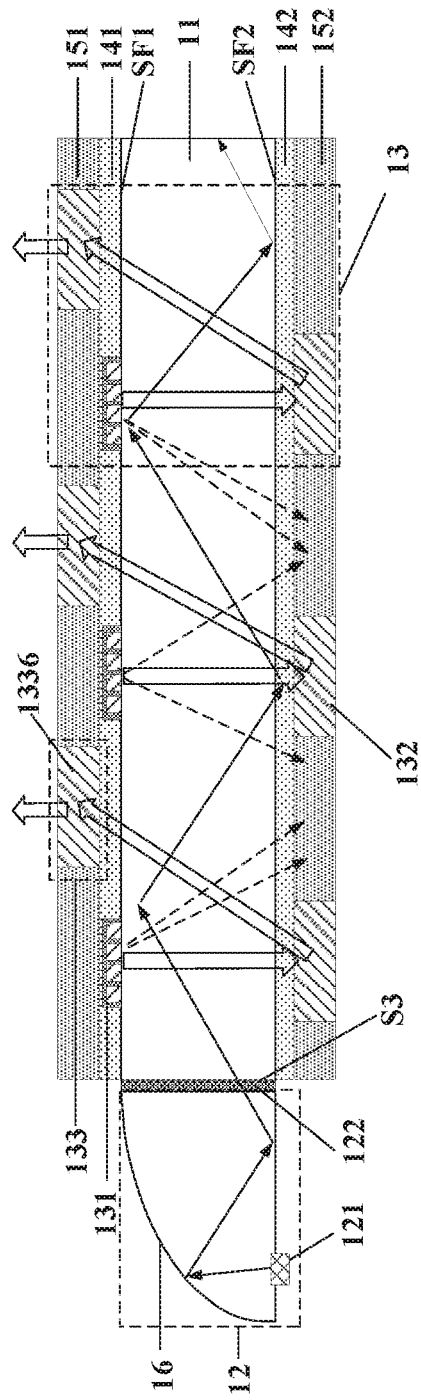
FIG. 10A
FIG. 10B

DISPLAY APPARATUS, BACKLIGHT MODULE IN DISPLAY APPARATUS, AND METHOD OF DISPLAYING IMAGE

CROSS-REFERENCE TO RELATED APPLICATION

This application is a national stage application under 35 U.S.C. § 371 of International Application No. PCT/CN2019/110410, filed Oct. 10, 2019, which claims priority to Chinese Patent Application No. 201910238545.9, filed Mar. 27, 2019. Each of the forgoing applications is herein incorporated by reference in its entirety for all purposes.

TECHNICAL FIELD

The present invention relates to display technology, more particularly, to a display apparatus, a backlight module in a display apparatus, and a method of displaying an image.

BACKGROUND

In present, light extracting gratings can be used in a backlight module of a display apparatus to extract light for the display apparatus to display images.

SUMMARY

In one aspect, the present invention provides a backlight module in a display apparatus, comprising a light guide plate; a plurality of reflective gratings on a first side of the light guide plate; and a plurality of reflectors on a second side of the light guide plate, wherein the second side is opposite to the first side; wherein a respective one of the plurality of reflective gratings is configured to diffract and reflect a portion of light totally reflected in the light guide plate into diffracted light transmitting across the light guide plate from the first side toward the second side, a portion of the diffracted light having a respective wavelength range to be received by a respective one of the plurality of reflectors; the respective one of the plurality of reflectors is configured to reflect the portion of the diffracted light having the respective wavelength range transmitting across the light guide plate from the second side toward the first side to a position between the respective one of the plurality of reflective gratings and an adjacent reflective grating of the plurality of reflective gratings.

Optionally, an orthographic projection of the respective one of the plurality of reflective gratings on the light guide plate at least partially overlaps with an orthographic projection of the respective one of the plurality of reflectors on the light guide plate.

Optionally, an angle between a reflecting surface of the respective one of the plurality of reflectors that reflects the portion of the diffracted light having the respective wavelength range and a second surface on the second side of the light guide plate satisfies a following equation:

$$\frac{1}{2}\arctan\left(\frac{p}{t}\right) < a < \frac{1}{2}\arctan\left(\frac{q+p}{t}\right);$$

wherein a stands for the angle between the reflecting surface of the respective one of the plurality of reflectors and the second surface on the second side of the light guide plate; p stands for a length, along a third direction along which the plurality of reflective gratings are arranged, of a portion of the respective one of the plurality of reflective gratings having an orthographic projection on the light guide plate overlapping with the orthographic projection of the respective one of the plurality of reflectors on the light guide plate; q stands for a distance between two adjacent reflective gratings of the plurality of reflective gratings along the third direction; and t stands for a thickness of the light guide plate.

Optionally, the backlight module further comprises a plurality of light direction adjustors on the first side of the light guide plate; wherein the respective one of the plurality of reflectors is configured to reflect the portion of the diffracted light, and to obtain reflected light having the respective wavelength range transmitting across the light guide plate from the second side toward the first side to be received by a respective one of the plurality of light direction adjustors and the respective one of the plurality of light direction adjustors is configured to change a first direction of the reflected light having the respective wavelength range, and to obtain adjusted light having the respective wavelength range transmitting along a second direction away from the first side of the light guide plate.

Optionally, an orthographic projection of the respective one of the plurality of light direction adjustors on the light guide plate is between an orthographic projection of the respective one of the plurality of reflective gratings on the light guide plate and an orthographic projection of the adjacent reflective grating of the plurality of reflective gratings on the light guide plate.

Optionally, the respective one of the plurality of light direction adjustors comprises an element selected from a group consisting of a prism, a transmissive grating, and a reflector micro-assembly; and wherein the reflector micro-assembly comprises a plurality of reflecting mirrors.

Optionally, the prism comprises a triangular prism.

Optionally, the respective one of the plurality of light direction adjustors comprises the plurality of reflecting mirrors; wherein the plurality of reflecting mirrors is arranged along a fourth direction; a reflecting surface of a respective one of the plurality of reflecting mirrors and a first surface on the first side of the light guide plate form an included angle greater than zero; and the fourth direction is parallel to the first surface of the first side of the light guide plate and intersecting reflective surfaces of the plurality of reflecting mirrors.

Optionally, a period of the respective one of the plurality of reflective gratings is calculated by a following equation: $n_i \sin \theta_i - n_d \sin \theta_d = m\lambda/\Lambda$; wherein $n_i$ stands for a refractive index of a material of the light guide plate through which an incident light transmits; $\theta_i$ stands for an incident angle of the incident light; $n_d$ stands for a refractive index of the material of the light guide plate through which the diffracted light diffracted by the respective one of the plurality of reflective gratings transmits; $\theta_d$ stands for a diffraction angle of the diffracted light; m stands for a diffraction order; $\lambda$ stands for a respective wavelength range of light diffracted by the respective one of the plurality of reflective gratings; and $\Lambda$ represents the period of the respective one of the plurality of reflective gratings.

Optionally, the respective one of the plurality of reflectors comprises an elements selected from a group consisting of a prism, a transmissive grating, and a reflector micro-assembly; wherein the reflector micro-assembly comprises a plurality of reflecting mirrors.

Optionally, the respective one of the plurality of reflectors comprises a triangular prism.

Optionally, the respective one of the plurality of reflectors comprises the plurality of reflecting mirrors; the plurality of reflecting mirrors is arranged along a fifth direction; a reflecting surface of a respective one of the plurality of reflecting mirrors and a second surface on the second side of the light guide plate form an include angle; and the fifth direction is parallel to the second surface on the second side of the light guide plate and intersecting reflective surfaces of the plurality of reflecting mirrors.

Optionally, the backlight module further comprises a first protective layer on the first side of the light guide plate; and a second protective layer on the second side of the light guide plate; wherein a refractive index of the light guide plate is greater than a refractive index of the first protective layer, and the refractive index of the light guide plate is greater than a refractive index of the second protective layer.

Optionally, the backlight module further comprises a first planarization layer on a side of the plurality of light direction adjustors away from the light guide plate; and a second planarization layer on a side of the plurality of reflectors away from the light guide plate.

Optionally, the backlight module further comprises a light source on a lateral side of the light guide plate, wherein the lateral side of the light guide plate is connected to a first surface on the first side of the light guide plate and a second surface on the second side of the light guide plate; and a color filter between the light source and the lateral side of the light guide plate, wherein the color filter comprises a plurality of color filter blocks respectively configured to filter light emitted from the light source into lights of selected wavelength ranges, respectively.

Optionally, the backlight module further comprises a light source on a lateral side of the light guide plate, wherein the lateral side of the light guide plate is connected to a first surface on the first side of the light guide plate and a second surface on the second side of the light guide plate; wherein the light source comprises a light emitting element of a first color, a light emitting element of a second color, and a light emitting element of a third color.

In another aspect, the present disclosure provides a display apparatus having a plurality of subpixel regions, comprising a backlight module described herein; a plurality of light direction adjustors on the first side of the light guide plate; an array substrate on a side of the plurality of reflective gratings and the plurality of light direction adjustors away from the light guide plate; a liquid crystal layer on a side of the array substrate away from the light guide plate; and a counter substrate on a side of the liquid crystal layer away from the array substrate, and comprising a first black matrix which comprises a plurality of black matrix blocks spaced apart from each other, a respective one of the plurality of black matrix blocks in a respective one of the plurality of subpixel regions; wherein a reflected light from the respective one of the plurality of reflectors having the respective wavelength range transmitting across the light guide plate from the second side toward the first side is configured to be received by a respective one of the plurality of light direction adjustors; the respective one of the plurality of light direction adjustors is configured to change a first direction of the reflected light having the respective wavelength range, to obtain adjusted light having the respective wavelength range transmitting along a second direction toward a respective one of the plurality of black matrix blocks; and an orthographic projection of the respective one of the plurality of black matrix blocks on the light guide plate at least partially overlaps with an orthographic projection of the respective one of the plurality of light direction adjustors on the light guide plate.

Optionally, the orthographic projection of the respective one of the plurality of black matrix blocks on the light guide plate is at least partially non-overlapping with an orthographic projection of the respective one of the plurality of reflective gratings on the light guide plate.

Optionally, the orthographic projection of the respective one of the plurality of black matrix blocks on the light guide plate is at least partially non-overlapping with an orthographic projection of the respective one of the plurality of reflectors on the light guide plate.

Optionally, the plurality of light direction adjustors are between the light guide plate and the array substrate; and a respective one of the plurality of light direction adjustors is between the respective one of the plurality of reflective gratings and the adjacent reflective grating of the plurality of reflective gratings.

Optionally, the plurality of light direction adjustors are attached on a base substrate of the array substrate.

Optionally, the backlight module further comprises a second black matrix in an inter-subpixel region of the display apparatus; wherein the second black matrix comprises a plurality of columns of black matrix bars and a plurality of rows of black matrix bars.

In another aspect, the present disclosure provides a method of displaying an image, comprising diffracting and reflecting a portion of light totally reflected in a light guide plate using a respective one of a plurality of reflective gratings on a first side of the light guide plate to obtain diffracted light transmitting across the light guide plate from the first side of the light guide plate toward a second side of a light guide plate opposite to the first side; receiving a portion of the diffracted light, the portion having a respective wavelength range, using a respective one of the plurality of reflectors on the second side of the light guide plate; reflecting the portion of the diffracted light having the respective wavelength range using the respective one of the plurality of reflectors to obtain reflected light having the respective wavelength range transmitting across the light guide plate from the second side toward the first side; receiving the reflected light having the respective wavelength range using a respective one of a plurality of light direction adjustors on the first side of the light guide plate; and changing a first direction of the reflected light having the respective wavelength range using the respective one of the plurality of light direction adjustors to obtain adjusted light having the respective wavelength range transmitting along a second direction toward a respective one of a plurality of black matrix blocks on the first side of the light guide plate; wherein an array substrate is on a side of the plurality of reflective gratings and the plurality of light direction adjustors away from the light guide plate; a liquid crystal layer is on a side of the array substrate away from the light guide plate; a counter substrate is on a side of the liquid crystal layer away from the array substrate, and comprises a first black matrix which comprises the plurality of black matrix blocks spaced apart from each other, a respective one of the plurality of black matrix blocks in a respective one of a plurality of subpixel regions; and an orthographic projection of the respective one of the plurality of black matrix blocks on the light guide plate at least partially overlaps with an orthographic projection of the respective one of the plurality of light direction adjustors on the light guide plate.

BRIEF DESCRIPTION OF THE FIGURES

The following drawings are merely examples for illustrative purposes according to various disclosed embodiments and are not intended to limit the scope of the present invention.

FIG. 10A is a schematic diagram of a structure of a display apparatus in some embodiments according to the present disclosure.

FIG. 10B is a schematic diagram of a structure of a display apparatus in some embodiments according to the present disclosure.

DETAILED DESCRIPTION

Figure 1:
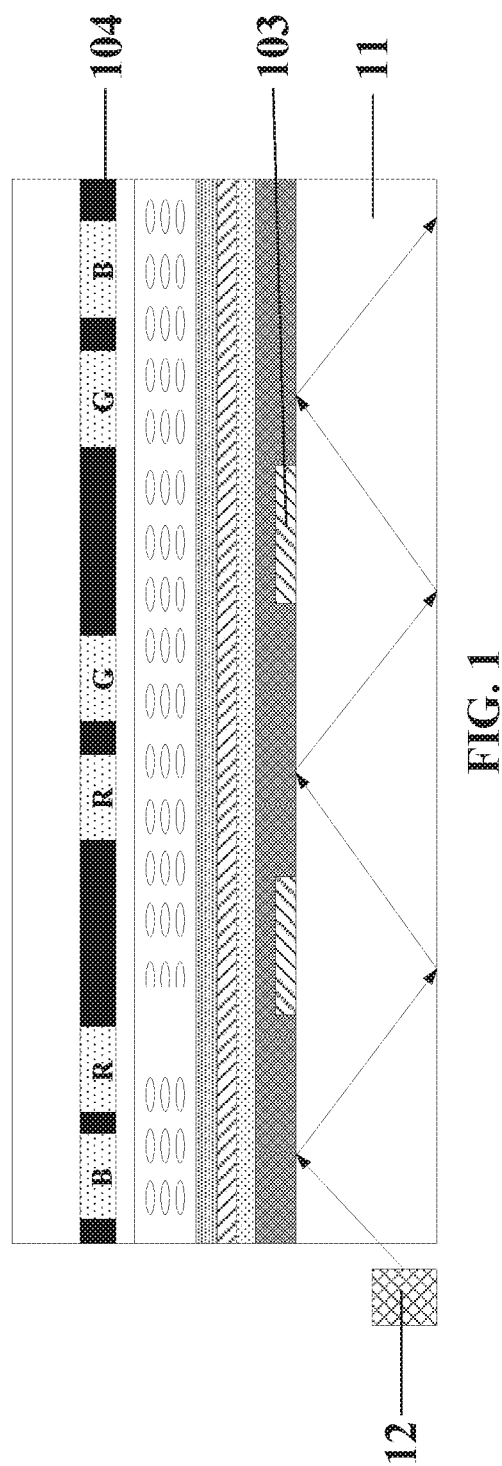
FIG. 1 is a schematic diagram of a structure of a display apparatus in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a display apparatus, a backlight module in a display apparatus, and a method of displaying an image that substantially obviate one or more of the problems due to limitations and disadvantages of the related art. In one aspect, the present disclosure provides a display apparatus having a plurality of subpixel regions. In some embodiments, the display apparatus includes a light guide plate; a plurality of reflective gratings and a plurality of light direction adjustors on a first side of the light guide plate; a plurality of reflectors on a second side of the light guide plate; an array substrate on a side of the plurality of reflective gratings and the plurality of light direction adjustors away from the light guide plate; a liquid crystal layer on a side of the array substrate away from the light guide plate; a counter substrate on a side of the liquid crystal layer away from the array substrate, and including a first black matrix which includes a plurality of black matrix blocks spaced apart from each other. Optionally, the second side is opposite to the first side. Optionally, a respective one of the plurality of black matrix blocks is in a respective one of the plurality of subpixel regions. Optionally, a respective one of the plurality of reflective gratings is configured to diffract and reflect a portion of light totally reflected in the light guide plate into diffracted light transmitting across the light guide plate from the first side toward the second side, a respective one of the plurality of reflectors configured to receive a portion of the diffracted light, the portion having a respective wavelength range. Optionally, the respective one of the plurality of reflectors is configured to reflect the portion of the diffracted light having the respective wavelength range, to obtain reflected light having the respective wavelength range transmitting across the light guide plate from the second side toward the first side to be received by a respective one of the plurality of light direction adjustors. Optionally, the respective one of the plurality of light direction adjustors is configured to change a first direction of the reflected light having the respective wavelength range, to obtain adjusted light having the respective wavelength range transmitting along a second direction toward a respective one of the plurality of black matrix blocks. Optionally, an orthographic projection of the respective one of the plurality of black matrix blocks on the light guide plate at least partially overlaps with an orthographic projection of the respective one of the plurality of light direction adjustors on the light guide plate.

FIG. 1 is a schematic diagram of a structure of a display apparatus in some embodiments according to the present disclosure. Referring to FIG. 1, in some embodiments, the display apparatus includes a light guide plate 11; and a light source 12 on a lateral side of the light guide plate 11. Optionally, light emitted from the light source 12 into the light guide plate 11 is totally reflected in the light guide plate 11. Optionally, by disposing light extracting gratings 103 on a first side or a second side of the light guide plate 11, the light extracting gratings 103 can extract out light totally reflected in the light guide plate 11. The first side and the second side are opposite to each other. The first side and the second side are connected by the lateral side of the light guide plate. Optionally, a black matrix 104 is disposed on the first side of the light guide plate 11. An orthographic projection of the black matrix 104 on the light guide plate 11 is at least partially overlapping with an orthographic projection of the light extracting gratings 103 on the light guide plate 11. Light extracted out from the light guide plate 11 is at least partially blocked by the black matrix 104, so, the display apparatus is at a dark state (L0). In a bright state (L255), a voltage is applied on a liquid crystal layer between the black matrix 104 and the light guide plate 11, a plurality of liquid crystal lenses are formed in the liquid crystal layer and diffract light extracted out of the light guide plate 11, so, at least a portion of light can transmit out of the display apparatus and is not blocked by the black matrix. By adjusting a value of the voltage applied to the liquid crystal layer, a refractive index of the plurality of liquid crystal lenses are changed, which can allow the display apparatus to display image having different grey scales.

The display apparatus shown in FIG. 1 cannot extract light in different colors from the light guide plate. In one example, when the light source is a monochromatic light source, the light extracted from the display apparatus in FIG. 1 has a same color as a color of the light emitted from the monochromatic light source. In another example, when the light source emits light with white color, the light extracted from the display apparatus in FIG. 1 only has white color.

Figure 2A:
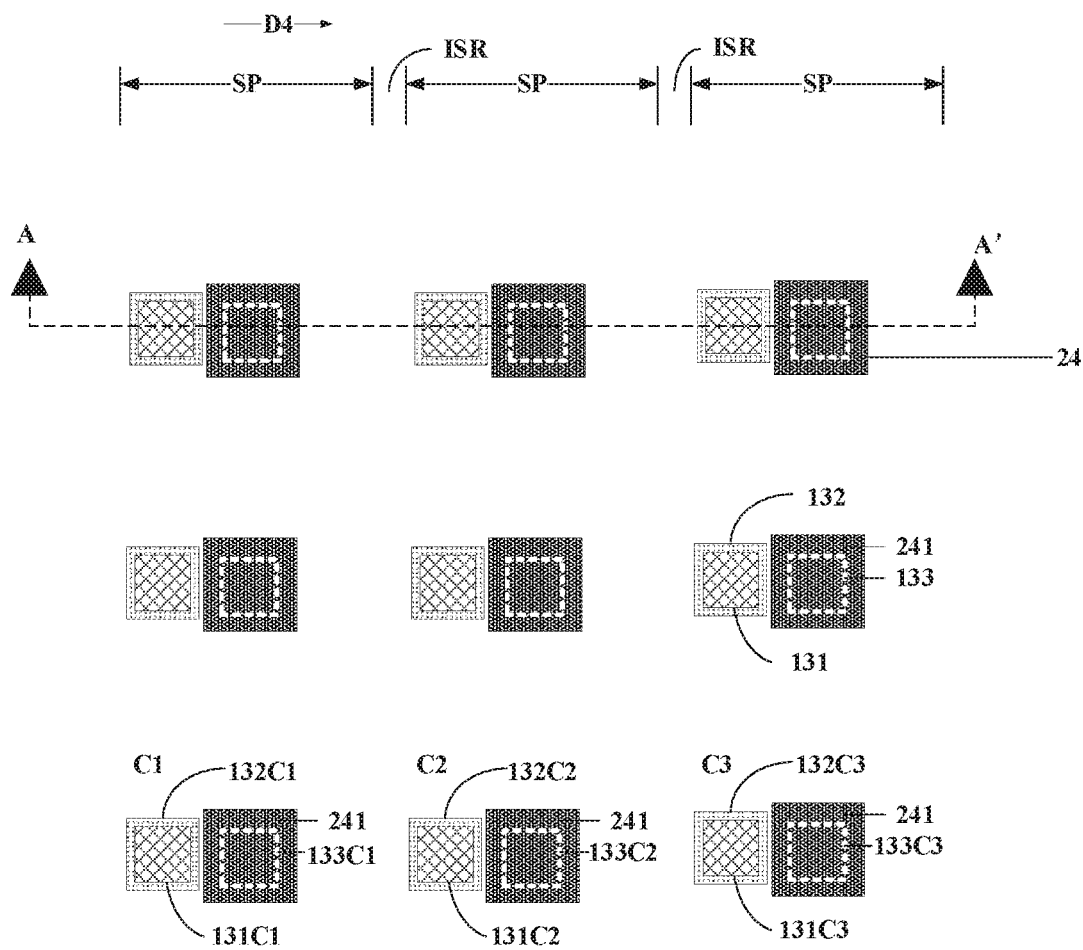
FIG. 2A is a plan view of a display apparatus in some embodiments according to the present disclosure.
Figure 2B:
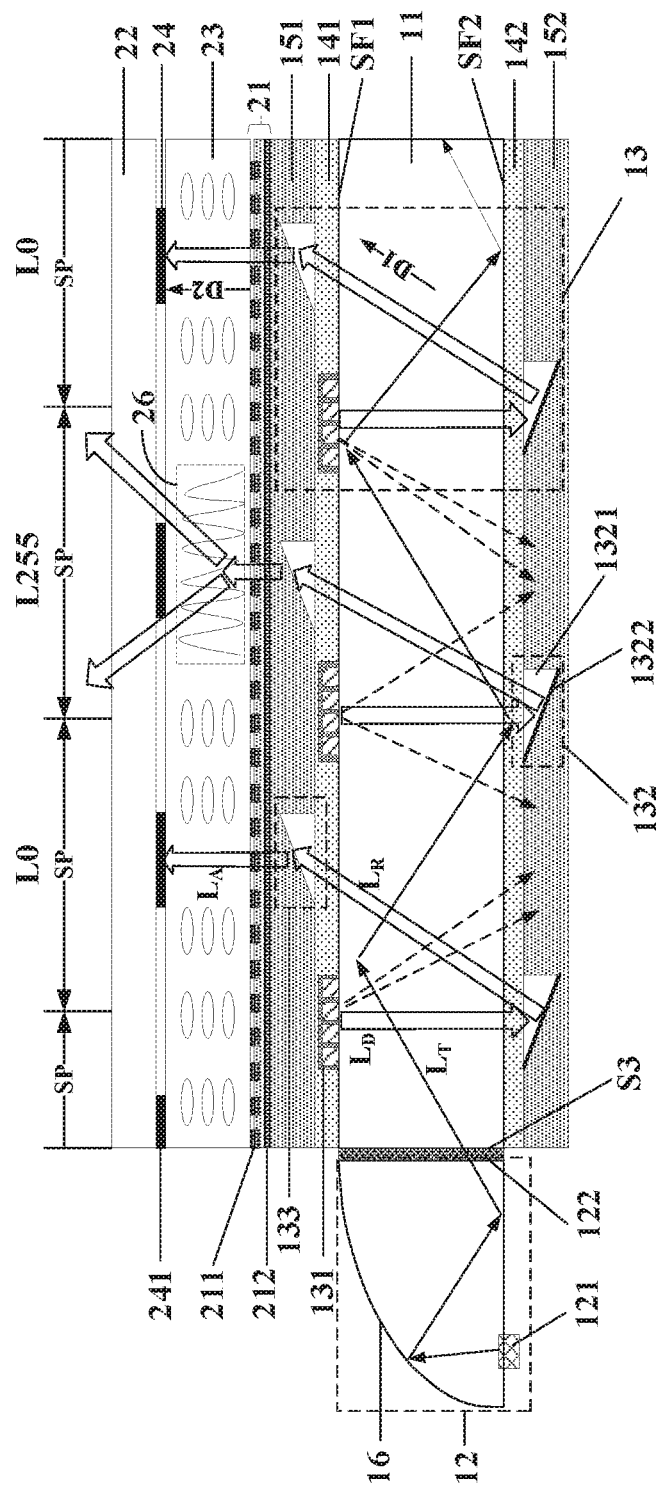
FIG. 2B a cross-sectional view along an A-A' line in FIG. 2A.

FIG. 2A is a plan view of a display apparatus in some embodiments according to the present disclosure. FIG. 2B is a cross-sectional view along an A-A' line in FIG. 2A. FIG.

Figure 3A:
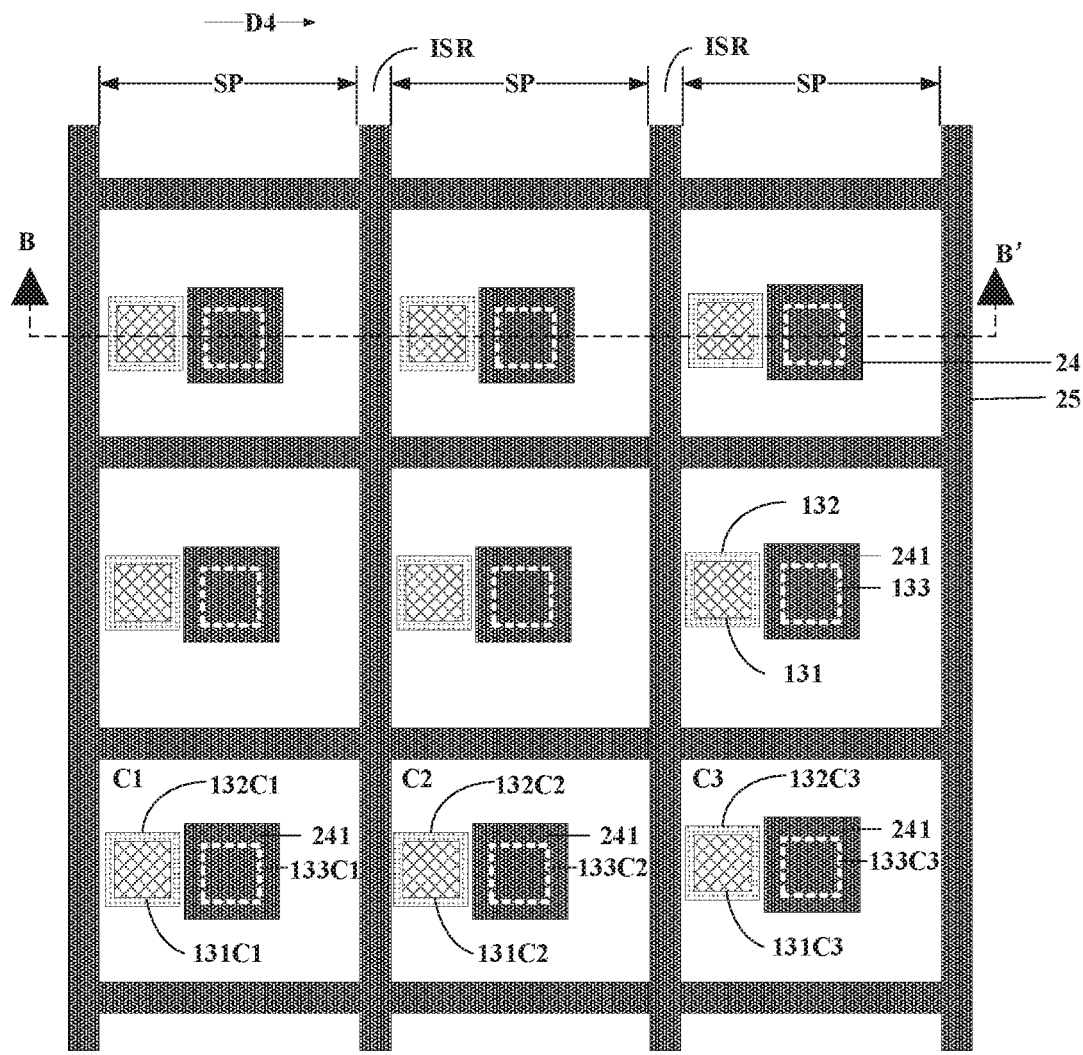
FIG. 3A is a plan view of a display apparatus in some embodiments according to the present disclosure.
Figure 3B:
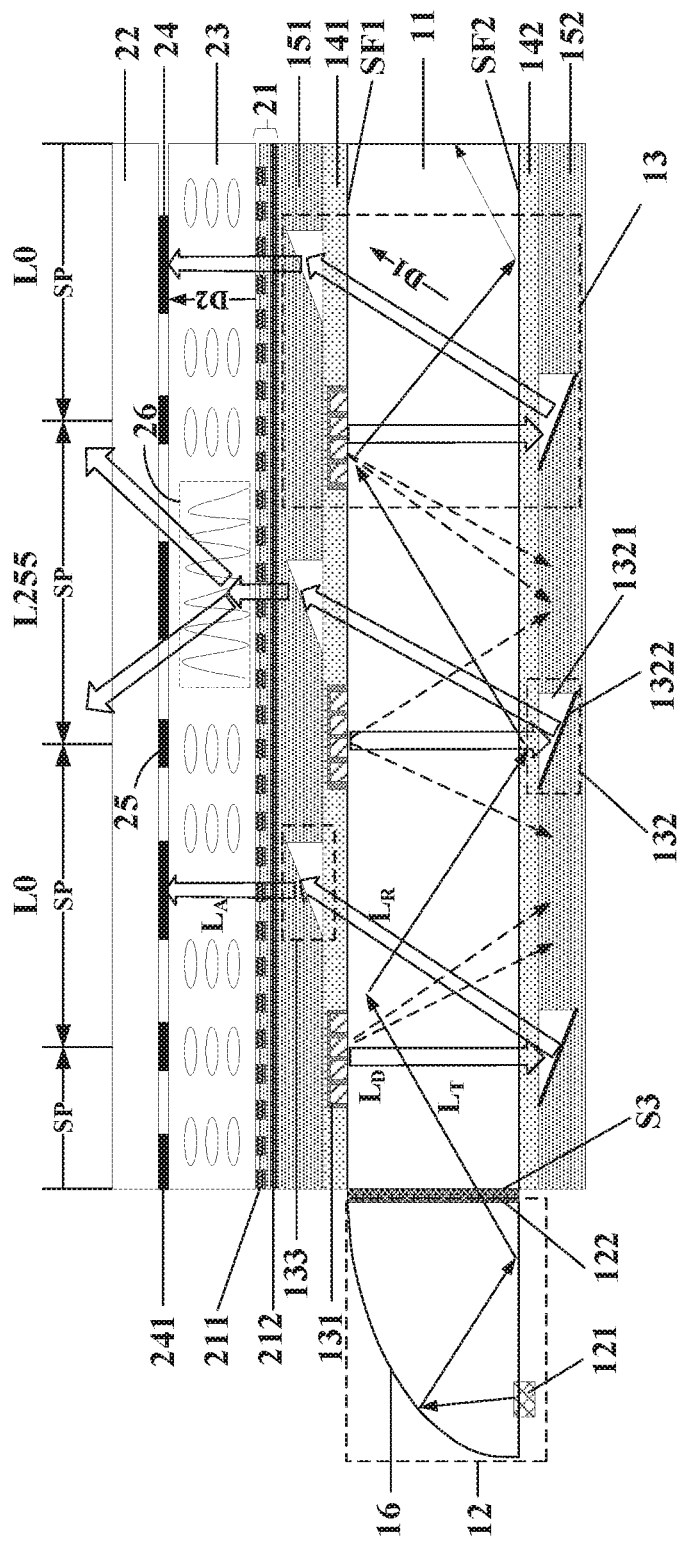
FIG. 3B a cross-sectional view along a B-B' line in FIG. 3A.

2C is a schematic diagram of a structure of a light guide plate in some embodiments according to the present disclosure. FIG. 3A is a plan view of a display apparatus in some embodiments according to the present disclosure. FIG. 3B is a cross-sectional view along a B-B' line in FIG. 3A. The difference between FIGS. 2A-2B and FIGS. 3A-3B is that the display apparatus in FIGS. 3A-3B includes a second black matrix 25 in the inter-subpixel region ISR, whereas the display apparatus in FIGS. 2A-2B does not include a second black matrix 25 in the inter-subpixel region ISR.

In some embodiments, referring to FIG. 2B and FIG. 3B, the display apparatus having a plurality of subpixel regions SP. As used herein, a subpixel region refers to a light emission region of a subpixel, such as a region corresponding to a pixel electrode in a liquid crystal display, a region corresponding to a light emissive layer in an organic light emitting diode display panel, or a region corresponding to the light transmission layer in the present disclosure. Optionally, a pixel may include a number of separate light emission regions corresponding to a number of subpixels in the pixel. Optionally, the subpixel region is a light emission region of a red color subpixel. Optionally, the subpixel region is a light emission region of a green color subpixel. Optionally, the subpixel region is a light emission region of a blue color subpixel. Optionally, the subpixel region is a light emission region of a white color subpixel.

In some embodiments, referring to FIG. 2A and FIG. 3A, the display apparatus further includes an inter-subpixel region. As used herein, an inter-subpixel region refers to a region between adjacent subpixel regions, such as a region corresponding to a black matrix in a liquid crystal display, a region corresponding a pixel definition layer in an organic light emitting diode display panel, or a black matrix in the present display panel. Optionally, the inter-subpixel region is a region between adjacent subpixel regions in a same pixel. Optionally, the inter-subpixel region is a region between two adjacent subpixel regions from two adjacent pixels. Optionally, the inter-subpixel region is a region between a subpixel region of a red color subpixel and a subpixel region of an adjacent green color subpixel. Optionally, the inter-subpixel region is a region between a subpixel region of a red color subpixel and a subpixel region of an adjacent blue color subpixel. Optionally, the inter-subpixel region is a region between a subpixel region of a green color subpixel and a subpixel region of an adjacent blue color subpixel.

In some embodiments, referring to FIGS. 2A-2C and FIGS. 3A-3B, the display apparatus includes a light guide plate 11; a plurality of reflective gratings 131 and a plurality of light direction adjustors 133 on a first side S1 of the light guide plate 11; a plurality of reflectors 132 on a second side S2 of the light guide plate 11; an array substrate 21 on a side of the plurality of reflective gratings 131 and the plurality of light direction adjustors 133 away from the light guide plate 11; a liquid crystal layer 23 on a side of the array substrate 21 away from the light guide plate 11; a counter substrate 22 on a side of the liquid crystal layer 23 away from the array substrate 21, and including a first black matrix 24. Optionally, the first black matrix 24 is between the liquid crystal layer 23 and the counter substrate 22.

Optionally, the first black matrix 24 includes a plurality of black matrix blocks 241 spaced apart from each other. Optionally, a respective one of the plurality of black matrix blocks 241 is in a respective one of the plurality of subpixel regions SP.

Optionally, the second side S2 is opposite to the first side S1. A first surface SF1 of the light guide plate 11 is on the first side S1. A second surface SF2 of the light guide plate 11 is on the second side S2. Optionally, the first side S1 of the light guide plate 11 is configured to allow light totally reflected in the light guide plate 11 to transmit out of the light guide plate 11. For example, the totally reflected light in the light guide plate 11 is extracted out from the first side S1 of the light guide plate. Optionally, a light having a selected incident angle with respect to the first surface SF1 on the first side S1 and the second surface SF2 on the second side S2 of the light guide plate 11 can be totally reflected in the light guide plate 11.

Comparing the display apparatus in FIG. 2B and FIG. 3B with the display apparatus in FIG. 1, the display apparatus in FIG. 2B and FIG. 3B can extract light with different colors out of the light guide plate 11. The display apparatus in FIG. 1 further includes color filters configured to filter light of white color into light with different colors such as light in red color, light in blue color, and light in yellow. The display apparatus in FIG. 2B and FIG. 3B is absent of any color filter in the plurality of subpixel regions SP, since the light guide plate can extract light with different colors.

Figure 2C:
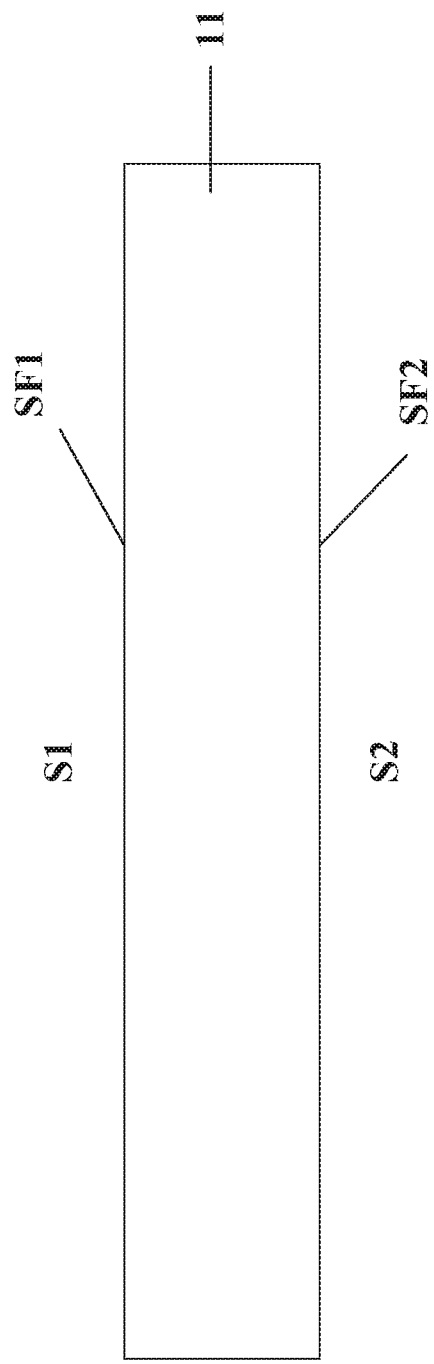
FIG. 2C is a schematic diagram of a structure of a light guide plate in some embodiments according to the present disclosure.

Optionally, the display apparatus in FIG. 2B, FIG. 2C, and FIG. 3B has a plurality of light extracting structures 13. In one example, a respective one of the plurality of light extracting structures 13 includes the respective one of the plurality of reflective gratings 131, and the respective one of the plurality reflectors 132. In another example, the respective one of the plurality of light extracting structures 13 includes the respective one of the plurality of reflective gratings 131, the respective one of the plurality reflectors 132, and the respective one of light direction adjustors 133.

In some embodiments, the display apparatus further includes a first protective layer 141 on the first side S1 of the light guide plate 11; and a second protective layer 142 on a second side S2 of the light guide plate 11. So, the first surface SF1 on the first side S1 is an interface between the light guide plate 11 and the first protective layer 141, the second surface SF2 on the second side S2 is an interface between the light guide plate 11 and the second protective layer 142. Optionally, a refractive index of the light guide plate 11 is greater than a refractive index of the first protective layer 141 and a refractive index of the second protective layer 142.

For example, the light guide plate 11 and the plurality of light direction adjustors 133 are spaced apart by the first protective layer 141, the light guide plate 11 and the plurality of reflectors 132 are spaced apart by the second protective layer 142. The refractive index of the first protective layer 141 is less than the refractive index of the light guide plate 11, which can allow light to be totally reflected by the first surface SF1 on the first side S1 of the light guide plate 11. The refractive index of the second protective layer 142 is less than the refractive index of the light guide plate 11, which can allow light to be totally reflected by the second surface SF2 on the second side of the light guide plate 11.

Optionally, the first protective layer 141 is on a side of the plurality of reflective gratings 131 away from the light guide plate 11, so the first protective layer 141 functions as a planarization layer planarizing the plurality of reflective gratings 131.

In some embodiments, referring to FIG. 2A and FIG. 3A, the display apparatus further includes a second black matrix 25 in the inter-subpixel region ISR. Optionally, the second black matrix 25 includes a plurality of columns of black matrix bars and a plurality of rows of black matrix bars.

Optionally, the second black matrix 25 is in the counter substrate. Optionally, the second black matrix 25 is in the array substrate.

In some embodiments, referring to FIG. 2B, FIG. 2C, and FIG. 3B, a respective one of the plurality of reflective gratings 131 is configured to diffract a portion of light $L_T$ totally reflected in the light guide plate 11 into diffracted light $L_D$ transmitting across the light guide plate 11 from the first side S1 toward the second side S2, and a respective one of the plurality of reflectors 132 is configured to receive a portion of the diffracted light $L_D$, the portion having a respective wavelength range.

In some embodiments, the respective one of the plurality of reflectors 132 is configured to reflect the portion of the diffracted light having the respective wavelength range, to obtain reflected light $L_R$ having the respective wavelength range transmitting across the light guide plate 11 from the second side S2 toward the first side S1 to be received by a respective one of the plurality of light direction adjustors 133.

In some embodiments, referring to FIG. 2A and FIG. 3A, the respective one of the plurality of light direction adjustors 133 is configured to change a first direction D1 of the reflected light $L_R$ having the respective wavelength range, to obtain adjusted light $L_A$ having the respective wavelength range transmitting along a second direction D2 toward a respective one of the plurality of black matrix blocks 241. Optionally, an orthographic projection of the respective one of the plurality of light direction adjustors 133 on the light guide plate 11 is between an orthographic projection of the respective one of the plurality of reflective gratings 131 on the light guide plate 11 and an orthographic projection of the adjacent reflective grating of the plurality of reflective gratings 131 on the light guide plate 11. Optionally, orthographic projections of the plurality of light direction adjustors 133 on the light guide plate 11 and orthographic projections of the plurality of reflective gratings 131 on the light guide plate 11 are alternatively arranged.

Optionally, the second direction D2 of the adjusted light $L_A$ having the respective wavelength range is perpendicular to a side of the first black matrix 24 closer to the light guide plate 11. Optionally, a direction of the portion of the diffracted light $L_D$ having a respective wavelength range is perpendicular to the second surface SF2 on the second side S2 of the light guide plate 11.

Optionally, referring to FIGS. 2A-2B and FIGS. 3A-3B, an orthographic projection of the respective one of the plurality of black matrix blocks 241 on the light guide plate 11 at least partially overlaps with an orthographic projection of the respective one of the plurality of light direction adjustors 133 on the light guide plate 11 shown by a dotted rectangular shape in FIG. 2A and FIG. 3A. Optionally, the orthographic projection of the respective one of the plurality of black matrix blocks 241 on the light guide plate 11 completely overlaps with the orthographic projection of the respective one of the plurality of light direction adjustors 133 on the light guide plate 11. Optionally, the orthographic projection of the respective one of the plurality of black matrix blocks 241 on the light guide plate 11 covers the orthographic projection of the respective one of the plurality of light direction adjustors 133 on the light guide plate 11.

Optionally, the orthographic projection of the respective one of the plurality of black matrix blocks 241 on the light guide plate 11 is at least partially non-overlapping with an orthographic projection of the respective one of the plurality of reflective gratings 131 on the light guide plate 11. Optionally, the orthographic projection of the respective one of the plurality of black matrix blocks 241 on the light guide plate 11 is non-overlapping with an orthographic projection of the respective one of the plurality of reflective gratings 131 on the light guide plate 11.

Optionally, the orthographic projection of the respective one of the plurality of black matrix blocks 241 on the light guide plate 11 is at least partially non-overlapping with an orthographic projection of the respective one of the plurality of reflectors 132 on the light guide plate 11. Optionally, the orthographic projection of the respective one of the plurality of black matrix blocks 241 on the light guide plate 11 is non-overlapping with an orthographic projection of the respective one of the plurality of reflectors 132 on the light guide plate 11.

Optionally, the orthographic projection of the respective one of the plurality of light direction adjustors 133 on the light guide plate 11 is at least partially non-overlapping with the orthographic projection of the respective one of the plurality of reflective gratings 131 on the light guide plate 11. Optionally, the orthographic projection of the respective one of the plurality of light direction adjustors 133 on the light guide plate 11 is non-overlapping with the orthographic projection of the respective one of the plurality of reflective gratings 131 on the light guide plate 11.

Optionally, the orthographic projection of the respective one of the plurality of light direction adjustors 133 on the light guide plate 11 is at least partially non-overlapping with an orthographic projection of the respective one of the plurality of reflectors 132 on the light guide plate 11. Optionally, the orthographic projection of the respective one of the plurality of light direction adjustors 133 on the light guide plate 11 is non-overlapping with an orthographic projection of the respective one of the plurality of reflectors 132 on the light guide plate 11.

Optionally, the orthographic projection of the respective one of the plurality of reflective gratings 131 on the light guide plate 11 is at least partially overlaps with the orthographic projection of the respective one of the plurality of reflectors 132 on the light guide plate 11. Optionally, the orthographic projection of the respective one of the plurality of reflective gratings 131 on the light guide plate 11 is completely overlaps with the orthographic projection of the respective one of the plurality of reflectors 132 on the light guide plate 11. Optionally, the orthographic projection of the respective one of the plurality of reflective gratings 131 on the light guide plate 11 covers the orthographic projection of the respective one of the plurality of reflectors 132 on the light guide plate 11. Optionally, the orthographic projection of the respective one of the plurality of reflectors 132 on the light guide plate 11 covers the orthographic projection of the respective one of the plurality of reflective gratings 131 on the light guide plate 11.

Optionally, the respective one of the plurality of reflective gratings 131, the respective one of the plurality of reflectors 132, the respective one of the plurality of light direction adjustors 133, and the respective one of the plurality of black matrix blocks 241 are optically coupled.

In some embodiments, referring to FIG. 2B and FIG. 3B, the liquid crystal layer 15 in the respective one of the plurality of subpixel regions SP is configured to be operated in a dark state and a bright state. In the dark state (L0), a first voltage is applied to the liquid crystal layer 15 in the respective one of the plurality of subpixel regions SP, the adjusted light $L_A$ is substantially blocked by the respective one of the plurality of black matrix blocks 241. In the bright state (L255), a second voltage is applied to the liquid crystal layer 15 in the respective one of the plurality of subpixel regions SP, forming a liquid crystal grating 26 having a plurality of liquid crystal lenses configured to refract at least a portion of the adjusted light $L_A$ to transmit out of the counter substrate 22. Optionally, the second voltage is greater than the first voltage. Optionally, the second voltage can choose different values so that the parameters of the plurality of liquid crystal lenses are different, therefore, each subpixel regions can display different grey scales.

As used herein, the term "substantially blocked" means at least 50 percent (e.g., at least 60 percent, at least 70 percent, at least 80 percent, at least 90 percent, and at least 95 percent) of light is absorbed or reflected by a black matrix. For example, at least 50 percent (e.g., at least 60 percent, at least 70 percent, at least 80 percent, at least 90 percent, and at least 95 percent) of the adjusted light $L_A$ having the respective wavelength range toward the respective one of the plurality of black matrix blocks 241 is absorbed or reflected by the respective one of the plurality of black matrix blocks 241.

Optionally, the display apparatus further includes a pixel electrode layer 211 and a common electrode layer 212 configured to apply voltages on the liquid crystal layer 23. Optionally, an advanced super dimension switch (ADS) mode is adopted, so the pixel electrode layer 211 and the common electrode layer 212 is on a side of the liquid crystal layer 23 closer to the light guide plate 11, and fringe fields formed by the pixel electrode layer 211 and the common electrode layer 212 can control the plurality of liquid crystal lenses in the liquid crystal layer 23. Optionally, other arrangements about the pixel electrode layer 211 and the common electrode layer 212 can also be used.

Optionally, in order to improve the light efficiency, the liquid crystal layer can be formed using liquid crystal having a high refractive index difference ($\Delta n$). Optionally, the counter substrate 22 includes a glass substrate having high transparency.

In some embodiments, at least a portion of the diffracted light having a wavelength outside the respective wavelength range transmits through the second side S2 of the light guide plate without being reflected by the respective one of the plurality of reflectors 132.

In some embodiments, referring to FIG. 2A and FIG. 3A, the display apparatus has a plurality of subpixel regions arranged in an array and forming a subpixel region array. Optionally, a respective one of the plurality of subpixel regions includes a respective one of the plurality of reflective gratings 131, a respective one of the plurality of reflectors 132, a respective one of the plurality of light direction adjustors 133, and a respective one of the plurality of black matrix blocks 241. Optionally, the plurality of reflective gratings 131 are arranged in an array corresponding to the subpixel region array. Optionally, the plurality of reflectors 132 are arranged in an array corresponding to the subpixel region array. Optionally, the plurality of light direction adjustors 133 are arranged in an array corresponding to the subpixel region array. Optionally, the plurality of black matrix blocks 241 are arranged in an array corresponding to the subpixel region array.

Optionally, the plurality of subpixel regions includes a subpixel region of a first color C1, a subpixel region of a second color C2, and a subpixel region of a third color C3. For example, the first color C1, the second color C2, and the third color C3 are different colors selected from a group consisting of a red color, a green color, and a blue color. Optionally, the plurality of reflective gratings 131 includes a first reflective grating 131C1, a second reflective grating 131C2, and a third reflective grating 131C3. Optionally, the plurality of reflectors 132 include a first reflector 132C1, a second reflector 132C2, and a third reflector 132C3. Optionally, the plurality of light direction adjustors 133 includes a first light direction adjustor 133C1, a second light direction adjustor 133C2, and the third light direction adjustor 133C3.

For example, in the subpixel region of the first color C1, the first reflector 132C1 receives a portion of diffracted light having a first wavelength range diffracted and reflected by the first reflective grating 131C1 having a first period, and reflects the portion of diffracted light having the first wavelength range to obtain reflected light having the first wavelength range transmitting toward the first light direction adjustor 133C1. The first light direction adjustor 133C1 changes the direction of the reflected light having the first wavelength range to obtain an adjusted light having the first wavelength range along a direction toward a black matrix block in the subpixel region of the first color C1.

For example, in the subpixel region of the second color C2, the second reflector 132C2 receives a portion of diffracted light having a second wavelength range diffracted and reflected by the second reflective grating 131C2 having a second period, and reflects the portion of diffracted light having the second wavelength range to obtain reflected light having the second wavelength range transmitting toward the second light direction adjustor 133C2. The second light direction adjustor 133C2 changes the direction of the reflected light having the second wavelength range to obtain an adjusted light having the second wavelength range along a direction toward a black matrix block in the subpixel region of the second color C2.

For example, in the subpixel region of the third color C3, the third reflector 132C3 receives a portion of diffracted light having a third wavelength range diffracted and reflected by the third reflective grating 131C3 having a third period, and reflects the portion of diffracted light having the third wavelength range to obtain reflected light having the third wavelength range transmitting toward the third light direction adjustor 133C3. The third light direction adjustor 133C3 changes the direction of the reflected light having the third wavelength range to obtain an adjusted light having the third wavelength range along a direction toward a black matrix block in the subpixel region of the third color C3.

Figure 4:
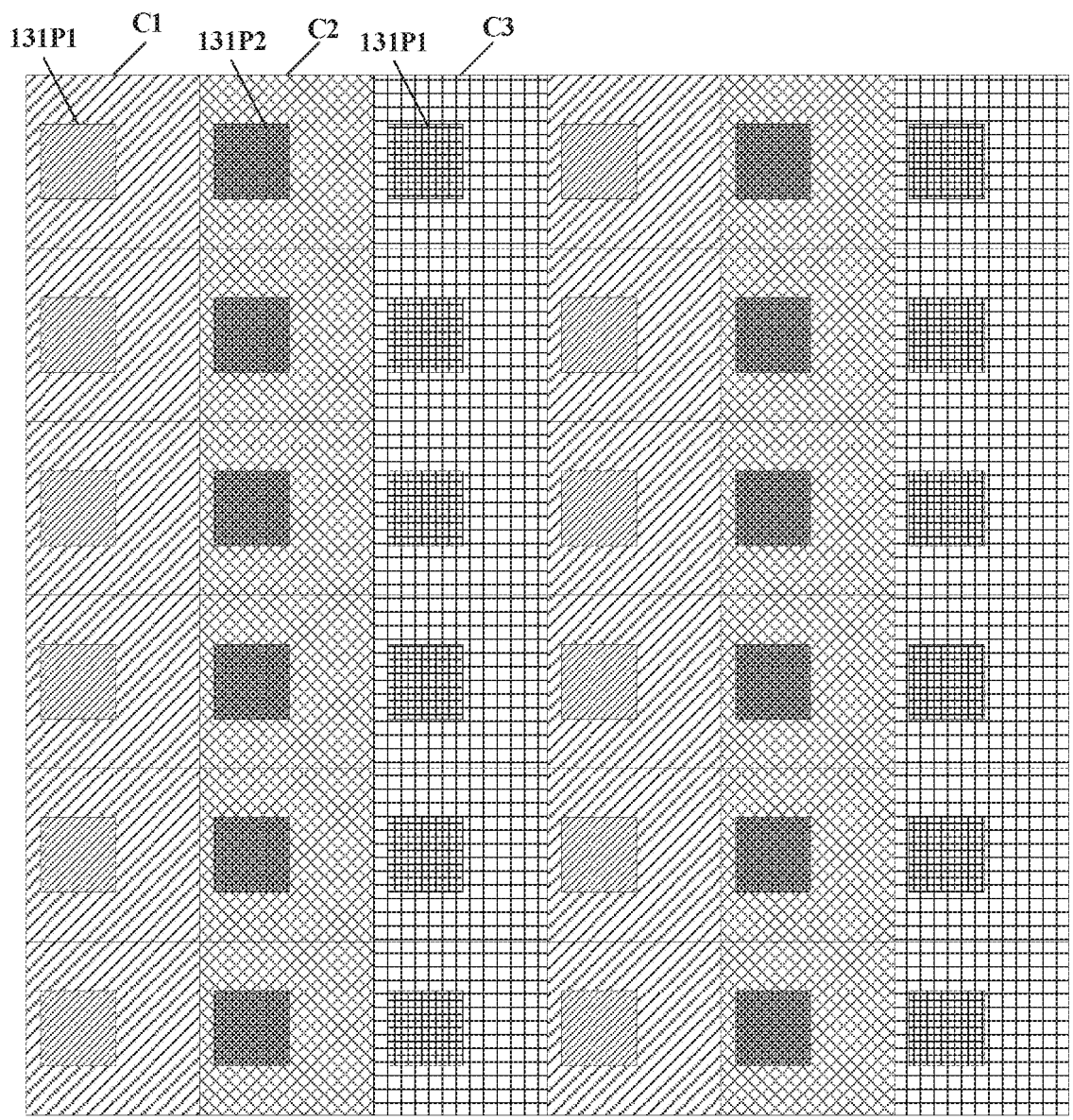
FIG. 4 is a plan view showing a plurality of reflective gratings respectively in a plurality of subpixel regions in some embodiments according to the present disclosure.

FIG. 4 is a plan view showing a plurality of reflective gratings respectively in a plurality of subpixel regions in some embodiments according to the present disclosure. Referring to FIG. 4, in some embodiments, the plurality of subpixel regions of the first color are arranged in a first color array, the plurality of subpixel regions of the second color are arranged in a second color array, and the plurality of subpixel regions of the third color are arranged in a third color array. The plurality of reflective gratings include a plurality of reflective gratings having the first period 131P1, a plurality of reflective gratings having the second period 131P2, and the plurality of reflective gratings having the third period 131P3. Optionally, the plurality of reflective gratings having the first period 131P1 are arranged in a first period array, the plurality of reflective gratings having the second period 131P2 are arranged in a second period array, and the plurality of reflective gratings having the third period 131P3 are arranged in a third period array. Optionally, the first color array corresponds to the first period array, the second color array corresponds to the second period array, and the third color array corresponds to the third period array.

Figure 5:
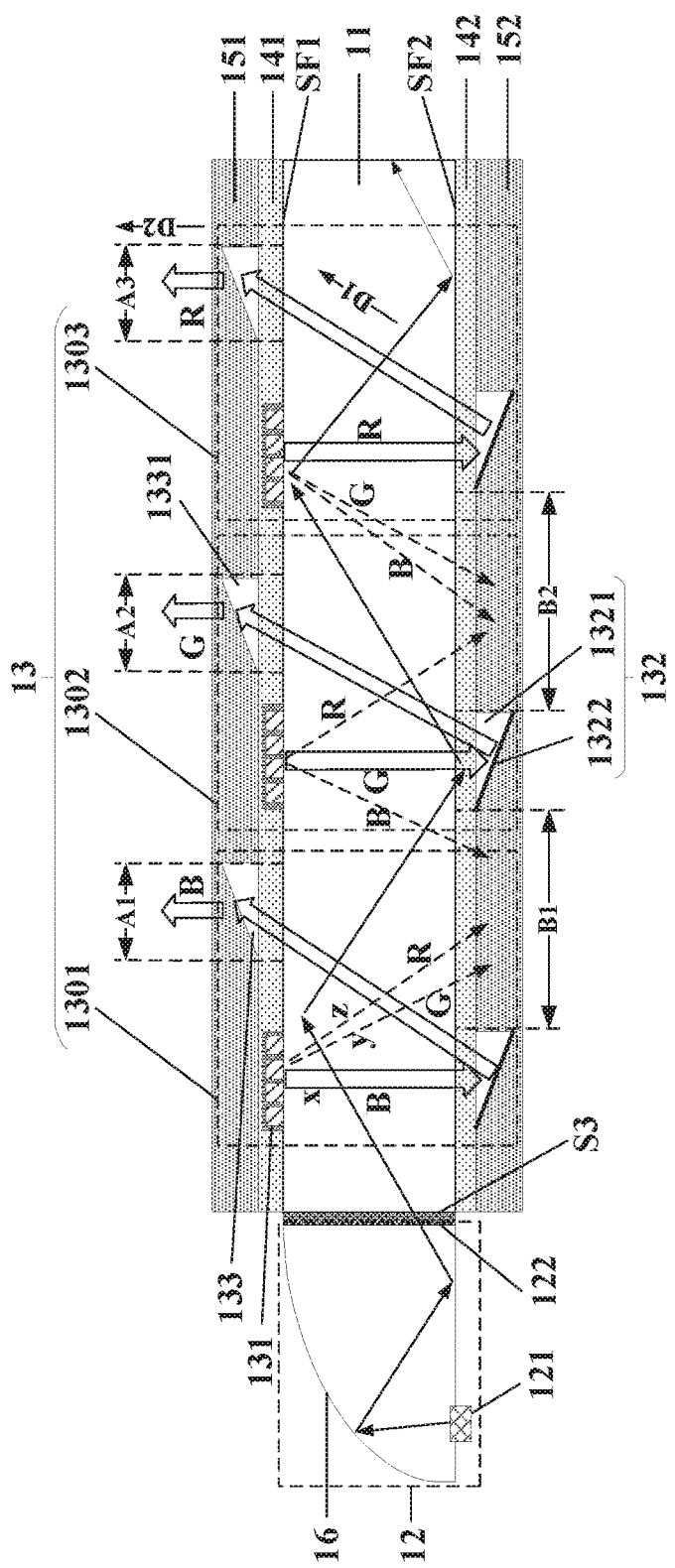
FIG. 5 is a schematic diagram of a partial structure of a display apparatus in some embodiments according to the present disclosure.

FIG. 5 is a schematic diagram of a partial structure of a display apparatus in some embodiments according to the present disclosure. In some embodiments, referring to FIG.

5 and FIG. 2C, the respective one of the plurality of light extracting structures 13 includes the plurality of reflective gratings 131 described herein, and the plurality of reflectors 132 described herein. Optionally, the respective one of the plurality of reflective gratings 131 is configured to diffract and reflect a portion of light totally reflected in the light guide plate 11 into diffracted light transmitting across the light guide plate 11 from the first side S1 toward the second side S1. Optionally, the diffracted light includes a light x (e.g., a light in blue color), a light y (e.g., a light in green color), and a light z (e.g., a light in red color). For example, the light x has the respective wavelength range in which the respective one of the plurality of reflective gratings 131 is designed to diffract toward the respective one of the plurality of reflectors 132. So, the light x is received by the respective one of the plurality of reflectors 132, but the light y and the light z is not received by the respective one of the plurality of reflectors 132 and transmit out of the second side of the light guide plate 11.

Optionally, the respective one of the plurality of reflectors 132 is configured to reflect the light x having the respective wavelength range and obtained the reflected light having the respective wavelength range transmitting across the light guide plate 11 from the second side S2 toward the first side S1 in the first direction D1. Optionally, the first direction D1 is a direction pre-designed based on the parameters of the respective one of the plurality of reflectors 132 and the respective one of the plurality of reflective gratings 131.

Because the respective one of the plurality of the reflective gratings 131 can diffract light having the respective wavelength range in the light guide plate 11 toward the respective one of the plurality of reflectors 132 and allow diffracted light having wavelength range outside the respective wavelength range to transmit out from the second side S2 of the light guide plate 11. And the respective one of the plurality of the reflector 132 can reflect the portion of the diffracted light having the respective wavelength range and obtain reflected light having the respective wavelength range transmitting toward the first side S1 of the light guide plate 11 in the first direction D1. So, light having the respective wavelength range can be extracted from the first side S1 of the light guide plate 11, and light having wavelength range outside the respective wavelength range can be filtered and transmitted out of the second side S2 of the light guide plate 11, and light having different wavelength ranges corresponding to different reflective gratings and different reflectors can be extracted from the first side S1 of the light guide plate 11.

In some embodiments, the light guide plate 11 is a structure transmitting light using total reflection. For example, the light guide plate 11 can totally reflect a light having a specific incident angle with respect to the first surface SF1 on the first side S1 and the second surface SF2 on the second side S2 of the light guide plate, the specific incident angle of the light should satisfy requirements of total reflection.

In some embodiments, a light source 12 is on a lateral side of the light guide plate 11. The light source 12 can emit light having the specific incident angle which satisfies the requirements of total reflection, so that light emitted from the light sources into the light guide plate 11 can transmit in the light guide plate 11. Optionally, in order to ensure a light transmittance of the display apparatus, the light guide plate 11 should have a high transparency. Optionally, in order to avoid light being diffracted or being absorbed by the light guide plate 11, the light guide plate 11 should have a lower Haze value. As user herein, the term "haze value" means a ratio of overall scattered light intensity to overall incident light intensity. For example, "haze" of the light guide plate 11 can be an indicator indicating transparency thereof, and may be measured using a haze-meter according to JIS K-6714. The smaller haze the light guide plate 11 has, the higher transparency the light guide plate 11 has. Optionally, the first surface SF1 on the first side S1 and the second surface on the second side S2 of the light guide plate 11 should have high flatness.

In some embodiments, referring to FIG. 2C and FIG. 5, the respective one of the plurality of light extracting structures 13 includes the respective one of the plurality of reflective gratings 131 on the first side S1 of the light guide plate 11, and the respective one of the plurality of reflectors 132 on the second side of the light guide plate 11. Light emitted from the light source 12 and transmitted into the light guide plate 11 can be totally reflected in the light guide plate 11. When a portion of light totally reflected in the light guide plate 11 is transmitted toward the respective one of the plurality of reflective gratings 131, the portion of the light is diffracted by the respective one of the plurality of reflective gratings 131 and becomes the diffracted light including the light x, the light y, and the light z. The light x having the respective wavelength range is transmitted toward the respective one of the plurality of reflectors 132, and the respective one of the plurality of reflectors 132 receives the light x having the respective wavelength range and reflects the light x to obtain the reflected light having the respective wavelength range toward the first side S1 of the light guide plate 11 along the first direction D1. For example, the display apparatus has a plurality of light emitting regions, including a first light emitting region A1, a second light emitting region A2, and a third light emitting region A3, on the first side of the light guide plate 11. The light y and the light z has wavelength range outside the respective wavelength range, so, the light y and the light z is not transmitted to the respective one of the plurality of reflectors 132. Also, incident angles of the light y and the light z with respect to the second side of the light guide plate 11 fail to satisfy the requirements of total reflection, so, the light y and the light z will transmit out from stray light emitting regions on the second side where the plurality of reflectors are absent, such as a first stray light emitting region B1 and a second stray light emitting region B2.

For example, by tuning grating parameters of the respective one of the plurality of reflective gratings 131, the respective one of the plurality of reflective gratings 131 can diffract and reflect light having the respective wavelength range toward the respective one of the plurality of reflectors 132, and allow the light having the wavelength range outside the respective wavelength range to transmit out from the second side of the light guide plate 11.

In some embodiments, the respective one of the plurality of light extracting structure 13 corresponds to a respective one of a plurality of subpixels, so, the respective one of the plurality of light extracting structure 13 extracts light having the respective wavelength range corresponds to the respective one of the plurality of subpixels. For example, a light extracting structure corresponding to a subpixel in red color only extracts a light in red color. A light extracting structure corresponding to a subpixel in blue color only extracts a light in blue color. A light extracting structure corresponding to a subpixel in green color only extracts a light in green color. So, different light extracting structures extract light in different colors to allow the display apparatus described herein to perform color display.

In some embodiments, the display apparatus described herein has N types of subpixels, N types of subpixels respectively display N different colors. The plurality of light extracting structures includes N types of light extracting structures. N types of light extracting structures can respectively extract light having N different colors. A respective one type of the N types of light extracting structures extract light having a respective one color of the N types different colors. Differences between different types of light extracting structures are based on different structure of reflective gratings respectively in different types of light extracting structures. For example, the respective one of the plurality of reflective gratings can diffract and reflect a light having a respective wavelength range toward a specific direction (e.g., the respective one of the plurality of reflectors), and diffract and reflect a light having a wavelength range outside the respective wavelength range toward a direction other than the specific direction to allow the light having the wavelength range outside the respective wavelength range to transmit out of the second side of the light guide plate.

In some embodiments, referring to FIG. 5 and FIG. 2C, one or a combination of light in red color, light in green color, and light in blue color can be extracted from the light guide plate 11 using different light extracting structures 13. Optionally, light having a color other than red color, green color, and blue color can also be extracted out of the light guide plate 11.

In some embodiments, referring to FIG. 5, the plurality of the light extracting structures 13 includes a first light extracting structure 1301, a second light extracting structure 1302, and a third light extracting structure 1303. For example, the first light extracting structure 1301 is configured to extract light in blue color, the second light extracting structure 1302 is configured to extract light in green color, and the third light extracting structure 1303 is configured to extract light in red color.

In some embodiments, light emitted from the light source 12, having the specific angle with respect to the first surface SF1 on the first side S1 and the second surface SF2 on the second side S2 of the light guide plate 11, is totally reflected in the light guide plate 11. When a portion of light totally reflected in the light guide plate 11 transmits to a respective one of the plurality of reflective gratings 131 in the first light extracting structure 1301, light in blue color is diffracted and reflected, and becomes diffracted light in blue color toward a respective one of the plurality of reflectors 132 in the first light extracting structure 1301. The diffracted light in blue color is received by the respective one of the plurality of reflectors 132 in the first light extracting structure 1301 and becomes reflected light in blue color toward the first light emitting regions A1 on the first side S1 of the light guide plate 11. And light in red color and light in green color is diffracted and reflected by the respective one of the plurality of reflective gratings 131 in the first light extracting structure 1301 toward the plurality of stray light emitting regions including the first stray light emitting region B1.

Optionally, when a portion of light totally reflected in the light guide plate 11 transmits to a respective one of the plurality of reflective gratings 131 in the second light extracting structure 1302, light in green color is diffracted and reflected, and becomes diffracted light in green color toward a respective one of the plurality of reflectors 132 in the second light extracting structure 1302. The diffracted light in green color is received by the respective one of the plurality of reflectors 132 in the second light extracting structure 1302 and becomes reflected light in green color toward the second light emitting regions A2 on the first side S1 of the light guide plate 11. And light in red color and light in blue color is diffracted and reflected by the respective one of the plurality of reflective gratings 131 in the second light extracting structure 1302 toward the plurality of stray light emitting regions including the first stray light emitting region B1 and the second stray light emitting region B2.

Optionally, when a portion of light totally reflected in the light guide plate 11 transmits to a respective one of the plurality of reflective gratings 131 in the third light extracting structure 1303, light in red color is diffracted and reflected, and becomes diffracted light in red color toward a respective one of the plurality of reflectors 132 in the third light extracting structure 1303. The diffracted light in red color is received by the respective one of the plurality of reflectors 132 in the third light extracting structure 1303 and becomes reflected light in red color toward the third light emitting regions A3 on the first side S1 of the light guide plate 11. And light in green color and light in blue color is diffracted and reflected by the respective one of the plurality of reflective gratings 131 in the third light extracting structure 1303 toward the plurality of stray light emitting regions including the second stray light emitting region B2.

By extracting light in different colors respective using different light extracting structures, the display apparatus described herein can perform color display, and allow stray light to emit out from the second side of the light guide plate. The display apparatus using the display apparatus is absent of any color filter in the plurality of subpixel regions, and absent of any light absorbing structure or light blocking structure configured to absorb or blocking stray light in the plurality of subpixel regions. So, the arrangement of the plurality of light extracting structures will not have adverse effect on the transparency of the display apparatus, and will not affect light transmit out from the first side of the light guide plate.

In some embodiments, the respective one of the plurality of reflective gratings 131 includes a dielectric grating and a grating reflecting layer on a side of the dielectric grating away from the light guide plate 11. Optionally, a metal layer is coated on the side of the dielectric grating away from the light guide plate 11.

Various appropriate type of gratings may be used as the respective one of the plurality of reflective gratings 131. Example of gratings suitable to be used as the respective one of the plurality of reflecting gratings 131 include, but are not limited to, a surface relief grating, a volume phase holographic grating. In one example, the respective one of the plurality of reflective gratings 131 is a step grating. In another example, the respective one of the plurality of reflective gratings 131 is a volume Bragg grating.

For example, a respective one of the reflective gratings 131 corresponds to a respective one of the plurality of light emitting regions, the respective one of the reflective gratings can be designed to diffract and reflect light having a respective wavelength range toward a respective one of the plurality of reflectors 132, based on a type of light required to be transmitted out of the respective one of the light emitting regions. For example, the first light emitting regions A1 is designed to emit light of blue color, and a wavelength range of light of blur color is in a range of 400 nm to 450 nm, so, the respective one of the plurality of reflective gratings is designed to diffract and reflect light having a wavelength range of 400 nm to 450 nm, e.g., 400 nm to 410 nm, 410 nm to 420 nm, 420 nm to 430 nm, 430 nm to 440 nm, and 440 nm to 450 nm, to the respective one of the plurality of reflectors. In one example, the respective one of the plurality of reflective gratings is designed to diffract and reflect light having a wavelength range of 425 nm to the respective one of the plurality of reflectors. In another example, the respective one of the plurality of reflective gratings is designed to diffract and reflect light having a wavelength range of 426 nm to the respective one of the plurality of reflectors.

Referring to FIG. 2C and FIG. 5, in order to better separate the light having the respective wavelength range from light having wavelength range outside the respective wavelength range, e.g., separate the light x from the light y and the light z, the respective one of the plurality reflective gratings 131 can be adjusted, so that the light having the respective wavelength range is reflected and diffracted by the respective one of the plurality of reflective gratings and becomes reflected light having the respective wavelength range transmitting along a direction perpendicular to the second surface SF2 on the second side S2 of the light guide plate 11. For example, the light x is transmitting along a direction perpendicular to the second surface SF2 on the second side S2 of the light guide plate 11. Optionally, the reflected light having the respective wavelength range can also transmits along a direction not perpendicular to the second surface SF2 on the second side S2 of the light guide plate 11.

In some embodiments, the respective one of the plurality of light extracting structures 13 further includes a respective one of the plurality of light direction adjustors 133 on the first side S1 of the light guide plate 11. Optionally, the respective one of the plurality of light direction adjustors 133 is configured to change the first direction D1 of the reflected light having the respective wavelength range, to obtain adjusted light transmitting along the second direction D2 toward the array substrate. Optionally, the second direction D2 of the adjusted light can be adjusted using the respective one of the plurality of light direction adjustors 133 to form collimated light. Optionally, the second direction D2 of the adjusted light and a side of the array substrate closer to the light guide plate 11 forms an incident angle less than 90 degrees.

Optionally, the respective one of the plurality of light direction adjustors 133 is on a portion of the first side S2 that the reflected light transmits to. For example, a position of the respective one of the plurality of light direction adjustors 133 is on an optical path of the respective one of the plurality of reflectors 131. So, the position of the respective one of the plurality of light direction adjustors 133 is set based on a position and optical parameters of the respective one of the plurality of reflectors 131.

In some embodiments, the respective one of the plurality of light direction adjustors 133 includes an element selected from a group consisting of a prism, a reflector micro-assembly including a plurality of reflecting mirrors, and a transmissive grating.

Figure 6:
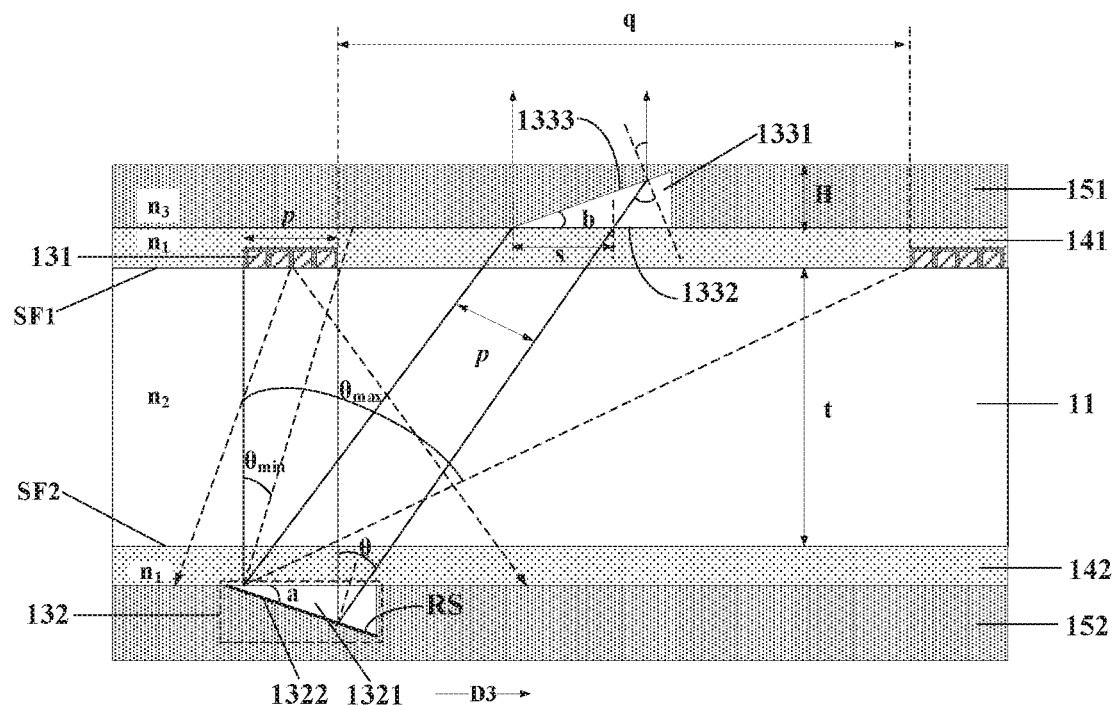
FIG. 6 is a zoon-in view of a partial structure of the display apparatus in FIG. 5.
Figure 7:
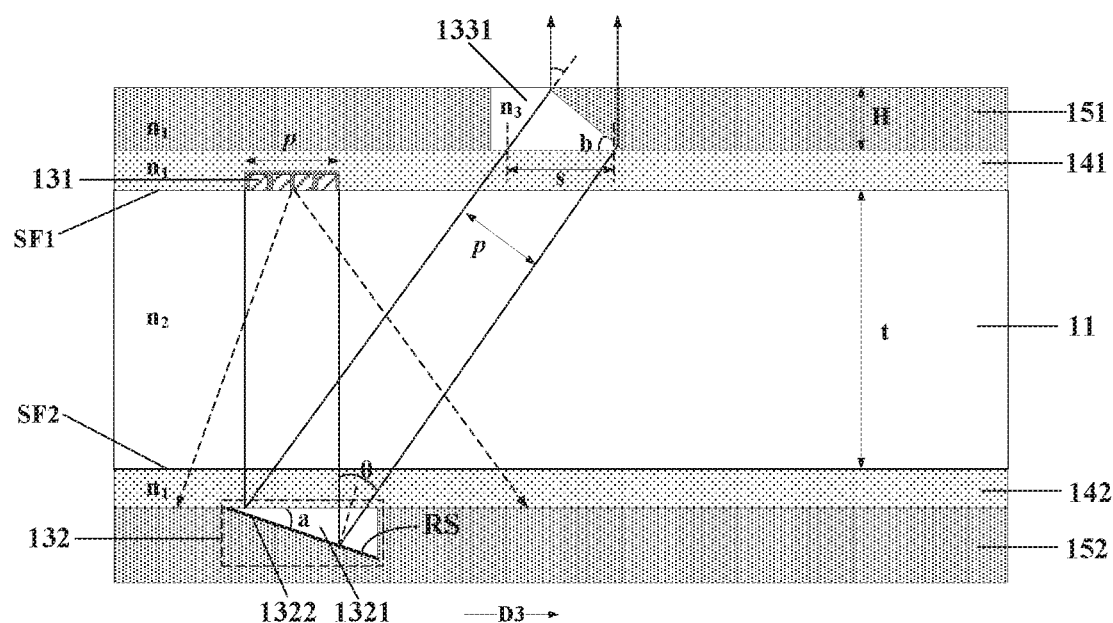
FIG. 7 is a schematic diagram of a partial structure of a display apparatus in some embodiments according to the present disclosure.

FIG. 6 is a zoon-in view of a partial structure of the display apparatus in FIG. 5. FIG. 7 is a schematic diagram of a partial structure of a display apparatus in some embodiments according to the present disclosure.

In some embodiments, referring to FIG. 5 to FIG. 7, the plurality of light direction adjustors 133 are a plurality of prisms. Optionally, the plurality of prisms includes a first prims 1331. For example, by adjusting a refracting angle of the first prism 1331, a degree of deflection of incident light (e.g., the reflected light) is changed, so the adjusted light transmit along the second direction which is different from the first direction of the reflected light, and it is possible to adjust the reflected light into collimated light using the first prism 1331.

Optionally, the plurality of prisms includes triangular prisms. Optionally, each triangular prism has a hypotenuse inclined with respect to a surface on the second side S2 of the light guide plate 11 at an angle a. A reflecting surface RS of the respective one of the plurality of reflectors 132 is a surface of the hypotenuse of the triangular prism. One of square edges of the triangular prism is disposed beside the second protective layer 142. Optionally, the one of the square edges of the triangular prism is in direct contact with the second protective layer 142. Optionally, the square edge in direct contact with the second protective layer 142 is substantially parallel to the second surface SF2 on the second side S2 of the light guide plate 11.

FIG. 6 and FIG. 7 show the respective one of the plurality of reflective gratings 131, the respective one of the plurality of reflectors 132, and the respective one of the plurality of light direction adjustors 133 in a same light extracting structure. In some embodiments, referring to both FIG. 6, and FIG. 7, the refracting angle of the first priors 1331 is an angle between two surfaces of the first prism 1331. The refracting angle b of the first prism 1331 is between a first prism surface 1332 of the first prism 1331 facing the light guide plate 11 and a second prism surface 1333 of the first prism 1331 facing the arrays substrate. Optionally, referring to FIG. 6, the refracting angle b is closer to the respective one of the plurality of reflectors 132. Optionally, referring to FIG. 7 the refracting angle b is away from the respective one of the plurality of reflectors 132. Optionally, the refracting angle b of the first prism 1331 should satisfies a following equation:

$$b = \text{arc}tg\left(\frac{\sin\theta}{\frac{n_1}{n_3} - \cos\theta}\right); \quad (3)$$

Figure 8:
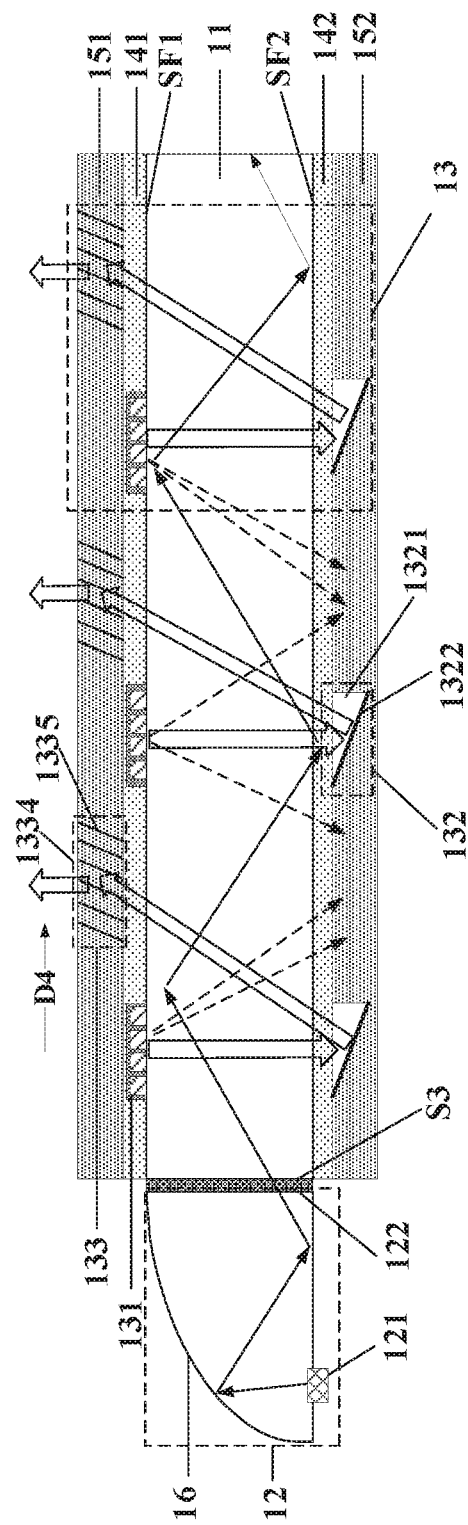
FIG. 8 is a schematic diagram of a partial structure of a display apparatus in some embodiments according to the present disclosure.
Figure 9A:
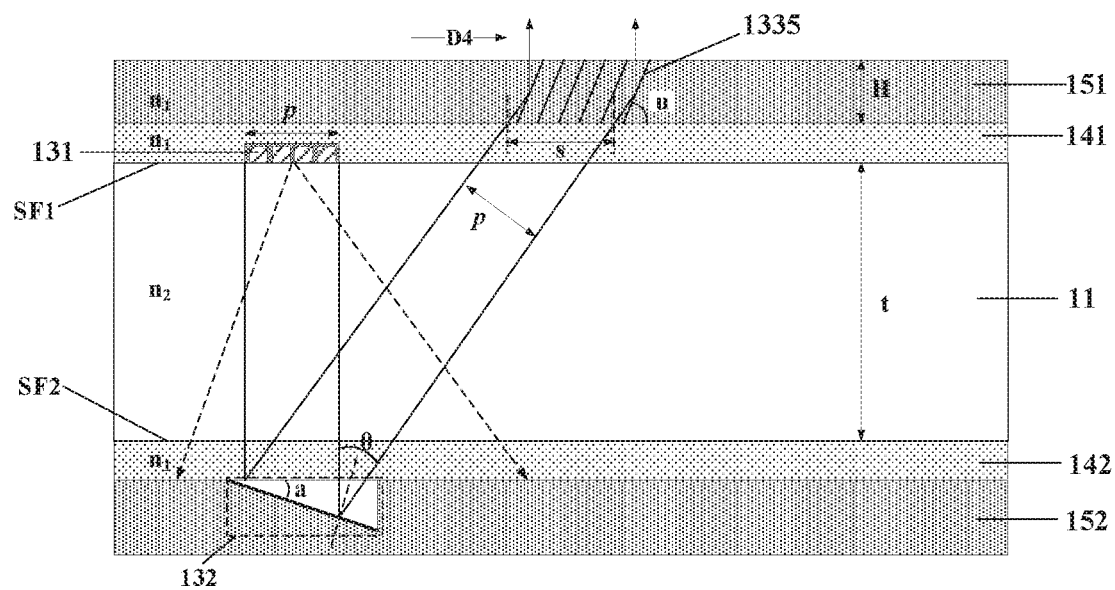
FIG. 9A is a zoon-in view of a partial structure of the display apparatus in FIG. 8.

FIG. 8 is a schematic diagram of a partial structure of a display apparatus in some embodiments according to the present disclosure. FIG. 9A is a zoon-in view of a partial structure of the display apparatus in FIG. 8. In some embodiments, referring to FIG. 2C, FIG. 8, and FIG. 9A, the plurality of light direction adjustors 133 are a plurality of reflector micro-assemblies 1334. Optionally, each of the plurality of reflector micro-assemblies 1334 includes a plurality of reflecting mirrors 1335. Optionally, each of the plurality of reflector micro-assemblies 1334 includes a plurality of reflecting films.

Optionally, the respective one of the plurality of light direction adjustors 133 includes the plurality of reflecting mirrors 1335 arranged along a fourth direction D4. Optionally, a reflecting surface of a respective one of the plurality of reflecting mirrors 1335 and the first surface SF1 on the first side S1 of the light guide plate 11 forms an included angle u greater than zero. Optionally, the fourth direction D4 is parallel to the first surface SF1 on the first side S1 of the light guide plate 11 and intersecting reflective surfaces of the plurality of reflecting mirrors 1335. For example, the included angle u is in a range of 10 degrees to 80 degrees.

For example, the respective one of the plurality of reflector micro-assemblies can change the direction of incident light (e.g., the reflected light). By adjusting the included angle u between the reflecting surface of the respective one of the plurality of reflecting mirrors 1335 and the first surface SF1 on the first side S1 of the light guide plate 11, a degree of deflection of incident light (e.g., the reflected light) is changed, so the adjusted light transmit along the second direction which is different from the first direction of the reflected light, and it is possible to adjust the reflected light into collimated light using the plurality of reflecting mirrors 1335.

FIG. 104 is a schematic diagram of a structure of a display apparatus in some embodiments according to the present disclosure. In some embodiments, referring to FIG. 10A, the plurality of light direction adjustors 133 are a plurality of transmissive gratings 1336. A respective one of the plurality of light direction adjustors 133 is a transmissive grating 1336. The transmissive grating 1336 can diffract light, so that the direction of incident light (e.g., the reflected light) can be changed, so the adjusted light transmit along the second direction which is different from the first direction of the reflected light, and it is possible to adjust the reflected light into collimated light using the plurality of transmissive grating 1336.

In some embodiments, referring to FIG. 6, a period of the respective one of the plurality of reflective gratings is calculated by a following equation:

$$n_i \sin \theta_i - n_d \sin \theta_d = m\lambda/\Lambda \quad (5);$$

wherein $n_i$ stands for a refractive index of a material of the light guide plate through which an incident light transmits; $\theta_i$ stands for an incident angle of the incident light; $n_d$ stands for a refractive index of the material of the light guide plate through which the diffracted light diffracted by the respective one of the plurality of reflective gratings transmits; $\theta_d$ stands for a diffraction angle of the diffracted light; m stands for a diffraction order, in one example, m=1, in another example, m=−1; λ stands for a respective wavelength range of light diffracted by the respective one of the plurality of reflective gratings, for example, λ stands for a center wavelength of the respective wavelength range of light diffracted by the respective one of the plurality of reflective gratings; and Λ represents the period of the respective one of the plurality of reflective gratings. So, different periods of different reflective gratings corresponding to subpixels of different colors can be calculated using the equation (1).

In some embodiments, referring to FIG. 6, FIG. 2A, and FIG. 3A, the orthographic projection of the respective one of the plurality of reflective gratings 131 on the light guide plate 11 at least partially overlaps with the orthographic projection of the respective one of the plurality of reflectors 132 on the light guide plate 11.

In some embodiments, an angle a between a reflecting surface RS of the respective one of the plurality of reflectors 132 that reflects the portion of the diffracted light having the respective wavelength range and the second side S2 of the light guide plate 11 satisfies a following equation:

$$\frac{1}{2}\arctan\left(\frac{p}{t}\right) < a < \frac{1}{2}\arctan\left(\frac{q+p}{t}\right) \quad (2)$$

wherein a stands for the angle between the reflecting surface of the respective one of the plurality of reflectors and a surface of the second side of the light guide plate; P stands for a length, along a third direction along which the plurality of reflective gratings are arranged, of a portion of the respective one of the plurality of reflective gratings having an orthographic projection on the light guide plate overlapping with the orthographic projection of the respective one of the plurality of reflectors on the light guide plate; q stands for a distance between two adjacent reflective gratings of the plurality of reflective gratings along the third direction; and t stands for a thickness of the light guide plate.

Because the orthographic projection of the respective one of the plurality of reflective gratings 131 on the light guide plate 11 at least partially overlaps with the orthographic projection of the respective one of the plurality of reflectors 132 on the light guide plate 11, reflected light having the respective wavelength range from the respective one of the plurality of reflective gratings 131 will transmit toward the respective one of the plurality of reflectors 132.

In order to obtain the equation (2), referring to FIG. 2B, FIG. 2C, FIG. 3B, and FIG. 6, it should be first determined that the minimum angle difference $\theta_{min}$ between the first direction of the reflected light having the respective wavelength range and a direction of the diffracted light having the respective wavelength range. For example, in FIG. 6, the direction of the diffracted light having the respective wavelength range is perpendicular to the second surface SF2 on the second side S2 of the light guide plate 11. The minimum angle difference $\theta_{min}$ is obtained when the diffracted light having the respective wavelength range is transmitting though an edge of the respective one of the plurality of reflective gratings 131. Also, the maximum different $\theta_{max}$ between the first direction of the reflected light having the respective wavelength range and the direction of the diffracted light having the respective wavelength range should limit the diffracted light having the respective wavelength range to transmit toward portions of the first side S1 between the respective one of the plurality of reflective gratings 131 and an adjacent reflective gratings, so, the maximum difference $\theta_{max}$ is obtained when the diffracted light having the respective wavelength range is transmitting though an edge of the adjacent reflective grating closer to the respective one of the plurality of reflective gratings 131. So, the angle difference between the first direction of the reflected light having the respective wavelength range and the direction of the diffracted light having the respective wavelength range should satisfies that $\theta_{min} < \theta < \theta_{max}$.

According to geometric relationships in FIG. 6, $$\theta_{min} = \arctan\left(\frac{p}{t}\right) \text{ and } \theta_{max} = \arctan\left(\frac{q+p}{t}\right),$$

the equation (2) can be obtained.

Optionally, the angle between the reflecting surface RS of the respective one of the plurality of reflectors 132 and the second side S2 of the light guide plate 11 is in a range of 1 degree to 12.5 degrees, e.g., 1 degree to 3 degrees, 3 degrees to 5 degrees, 5 degrees to 7 degrees, 7 degrees to 9 degrees, 9 degrees to 11 degrees, and 11 degrees to 12.5 degrees, this range makes sure that the reflected light having the respective wavelength range can be transmits out from portions of the first side S1 between the respective one of the plurality of reflective gratings 131 and an adjacent reflective gratings. So, the reflected light can be a collimated light and transmit along a specific direction by adjusting the respective one of the plurality of reflectors 132.

In some embodiments, a respective one of the plurality of reflectors 132 includes an elements selected from a group consisting of a prism, a reflector micro-assembly including a plurality of reflecting mirrors, and a transmissive grating.

Optionally, referring to FIG. 2C and FIG. 5, the plurality of reflectors 132 are a plurality of prisms. Optionally, the plurality of prisms includes a second prism 1321. Optionally, the respective one of the plurality of reflectors includes the second prism 1321 (e.g., the prism) and a reflecting layer is on a side of the second prism 1321 (e.g., the prism) away from the light guide plate 11. For example, the reflecting layer is configured to reflect the diffracted light having the respective wavelength range toward the first side S1 of the light guide plate 1. In one example, the reflecting layer is a metal layer coating on a side of the second prism 1321 away from the light guide plate 11. In another example, the reflecting layer is a reflecting film coating on a side of the second prism 1321 away from the light guide plate 11. Optionally, the second prism 1321 is a triangular prism. Optionally, the plurality of prisms is arranged in array.

Figure 9B:
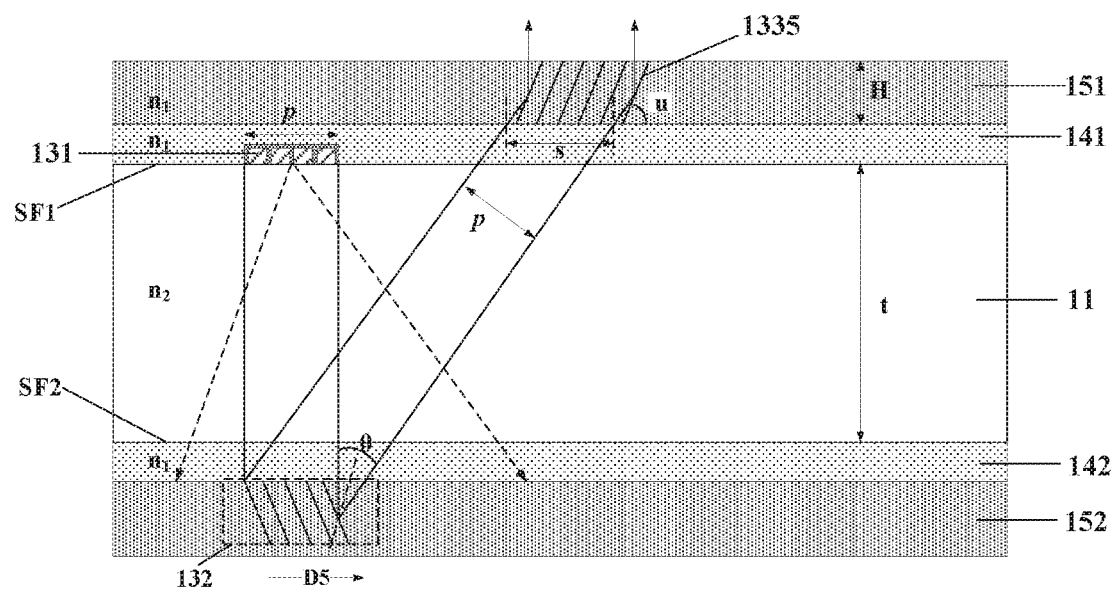
FIG. 9B is a zoon-in view of a partial structure of the display apparatus in FIG. 8.

FIG. 9B is a zoon-in view of a partial structure of the display apparatus in FIG. 8. In some embodiments, referring to FIG. 99, the plurality of reflectors 132 are a plurality of reflector micro-assemblies. Optionally, each of the plurality of reflector micro-assemblies includes a plurality of reflecting mirrors. For example, the plurality of reflecting mirrors is arranged along a fifth direction D5, a reflecting surface of a respective one of the plurality of reflecting mirrors and the second side S2 of the light guide plate form an include angle, and the fifth direction D5 is parallel to the second surface SF2 on the second side S2 of the light guide plate 11 and intersecting reflective surfaces of the plurality of reflecting mirrors. Optionally, each of the plurality of reflector micro-assemblies includes a plurality of reflecting films.

FIG. 10B is a schematic diagram of a structure of a display apparatus in some embodiments according to the present disclosure. In some embodiments, referring to FIG. 10B, the plurality of reflectors 132 are a plurality of reflective gratings.

In some embodiments, referring to FIG. 2B and FIG. 39, the display apparatus further includes a first planarization layer 151 on a side of the plurality of light direction adjustors 133 away from the light guide plate 11; and a second planarization layer 152 on a side of the plurality of reflectors 132 away from the light guide plate 11.

Various materials may be used for making the first planarization layer 151. A refractive index of a material used for making the first planarization layer 151 is determined based on the properties of the plurality of light direction adjustors 133.

Various materials may be used for making the second planarization layer 152. A refractive index of a material used for making the second planarization layer 152 is determined based on the properties of the plurality of reflectors 132.

In some embodiments, referring to FIG. 2B, FIG. 2C, and FIG. 3B, the display apparatus further includes a light source 12 on a lateral side S3 of the light guide plate 11 and configured to emit light into the light guide plate 11, and a color filter 122 is between the light source 12 and the lateral side S3 of the light guide plate 11. Optionally, the lateral side S3 connects the first surface SF1 on the first side S1 and the second surface SF2 on the second side S2 of the light guide plate 11. Optionally, the light source 12 includes the color filter 122. Optionally, the color filter 122 includes a plurality of color filter blocks respectively configured to filter light emitted from the light source 12 into lights of selected wavelength ranges, respectively.

Optionally, the light source 12 is disposed on a lateral side of the light guide plate 11. Optionally, a plurality of light source are disposed on a plurality of lateral sides of the light guide plate 11, respectively. When the light emitted from the light source 12 into the light guide plate 11 satisfies the requirement of total reflection in the light guide plate 11.

In one example, referring to FIG. 2B and FIG. 3B, the light source 12 includes a light emitting elements 121 emitting light in white color, and the color filter 122 on the lateral side of the light guide plate 11 closer to the light source 12. Optionally, the color filter 122 is configured to filter the light in white color emitted from the light emitting elements, to obtain light having narrow wavelength ranges including a wavelength range corresponding to red color, a wavelength range corresponding to blue color, and a wavelength range corresponding to green color, which may ensure a collimation level of the light extracted by the plurality of light extracting structures, and improve the overall color quality displayed by the display apparatus.

Various appropriate light emitting elements may be used in the light source. Example of light emitting elements suitable to be used in the light source include, but are not limited to, light emitting diode (LED) and light emitting elements emitting light in white color. Optionally, the light emitting element has a relatively small size.

In another example, the light source 12 includes at least three types of light emitting elements respectively emitting light in different colors. For example, the at least three types of light emitting elements includes an LED emitting light in red color, an LED emitting light in blue color, and an LED emitting light in green color. So, light emitted from the at least three types of light emitting elements are blended light including light in red color, light in blue color, and light in green color, a wavelength range of the blended light is narrower than the wavelength range of light in white color. In order to have a better color display quality, the light source 12 can further include a color filter 122.

In some embodiments, referring to FIG. 2B and FIG. 3B, the display apparatus further includes a reflecting cap 16 configured to reflect light from the light emitting element 121 to the light guide plate 11, therefore, the light source 12 and the light guide plate 11 is optically coupled. Optionally, the reflecting cap 16 is on the lateral side S3 of the light guide plate 11. Optionally, the reflecting cap 16 can reflect light from the light emitting element 121 into the light guide plate 11 along a specific direction, so that the light can be totally reflected in the light guide plate 11.

In some embodiments, referring to FIG. 6 and FIG. 7, the respective one of the plurality of light direction adjustors 133 includes the first prism 1331, and the respective one of the plurality of reflectors 132 includes the second prism 1321.

In some embodiments, referring to FIG. 6, the refracting angle h of the first prism 1331 between the first prism surface 1332 and the second prism surface 1333 is closer to the respective one of the plurality of reflectors 132 and the respective one of the plurality of reflective gratings 131. If a refractive index of the second prism 1321 is equivalent to a refractive index of the second protective layer 142, the angle a between the reflecting surface RS of the second prism 1321 and the second side S2 of the light guide plate 11 satisfies a following equation: a=θ/2. If the refractive index of the second prism 1321 is different from the refractive index of the second protective layer 142, the angle a can be calculated based on geometric refraction relationships between incident light and refracted light.

Referring to FIG. 2B, FIG. 2C, FIG. 3B, and FIG. 6, since the refracting angle b of the first prism 1331 is closer to the respective one of the plurality of reflectors 132 and the respective one of the plurality of reflective gratings 131, in order to adjust the reflected light $L_R$ using the first prism 1331 and to obtain collimated light (e.g., the adjusted light $L_A$), the first planarization layer 151 should has a refractive index greater than a refractive index of the first priors 1331. Optionally, the refractive index of the first planarization layer 151 is $n_3$, and the refractive index of the first prism 1331 is $n_1$, $n_3 > n_1$. Optionally, the refractive index of the first prism 1331 is equivalent to the refractive index of the first protective layer 141. Optionally, the refractive index of the first prism 1331 is equivalent to the refractive index of the first protective layer 141 and the refractive index of the second protective layer 142.

For example, the adjusted light $L_A$ is perpendicular to the first surface SF1 on the first side S1 of the light guide plate 11, the refracting angle b of the first prism 1331 should satisfies a following equation:

$$b = \text{arc}tg\left(\frac{\sin\theta}{\frac{n_1}{n_3} - \cos\theta}\right); \quad (3)$$

wherein $n_3 > n_1$, the refractive index of the first prism and the refractive index of the first protective layer is $n_1$, and the refractive index of the first planarization layer is $n_3$.

In order to ensure that the portion of the diffracted light having the respective wavelength range diffracted and reflected by the respective one of the plurality of reflective gratings 131 is received by the second prism 1321, an orthographic projection of the side of the second prism 1321, closer to the light guide plate 11, on the light guide plate 11 at least partially overlaps with the orthographic projection of respective one of the plurality of reflective gratings 131 on the light guide plate 11. Optionally, the orthographic projection of the side of the second prism 1321, closer to the light guide plate 11, on the light guide plate 11 completely overlaps with the orthographic projection of respective one of the plurality of reflective gratings 131 on the light guide plate 11. Optionally, the orthographic projection of the side of the second prism 1321, closer to the light guide plate 11, on the light guide plate 11 covers the orthographic projection of respective one of the plurality of reflective gratings 131 on the light guide plate 11. Optionally, the orthographic projection of respective one of the plurality of reflective gratings 131 on the light guide plate 11 covers the orthographic projection of the side of the second prism 1321, closer to the light guide plate 11, on the light guide plate 11.

For example, the diffracted light having the respective wavelength range is along the direction perpendicular to the second surface SF2 on the second side S2 of the light guide plate 11, and the length of the side of the second prism 1321, closer to the light guide plate 11, has an orthographic projection 131 on the light guide plate 11 overlaps with the orthographic projection of respective one of the plurality of reflective gratings 131 on the light guide plate 11.

Optionally, the reflected light having the respective wavelength range is received by a portion of a side of the first prism 1331 closer to the light guide plate 11, a lengths of the portion of the side of the first prism 1331 along the third direction D3 can be calculated using a following equation:

$$S = p/\sin(\theta) \quad (5);$$

Optionally, the minimum height H of the first prism 1331 for fully covering the reflected light having the respective wavelength range is calculated using a following equation:

$$H = S^*\sin(\theta+90)/\sin(90-b-\theta)^*\sin(b) \quad (6);$$

Based on the equations (3) to (6), parameters of the first prism 1331 and parameters of second prism 1321 can be determines.

For example, a thickness t of the light guide plate 11 is 500 um, the refractive index of the first protective layer 141 and the refractive index of the first prism 1331 is $n_1=1.25$, the refractive index of the first planarization layer 151 is $n_3=1.8$, the length P, along a third direction D3, of the portion of the respective one of the plurality of reflective gratings 131 having the orthographic projection on the light guide plate 11 overlapping with the orthographic projection of the respective one of the plurality of reflectors 132 on the light guide plate 11 is 16 um, and the distance q between two adjacent reflective gratings of the plurality of reflective gratings 131 along the third direction D3 is 250 um.

Based on the equation (2) and the relationships between the angle a and the angle θ, the angle θ is 2°<θ<25°. Based on different values of the angle θ, the length s of the portion of the side of the first prism 1331 along the third direction D3, the refracting angle b, the minimum height H of the first prism 1331 can be determined and shown in the follow table 1:

TABLE 1

| θ/° | s/μm | b/° | H/μm |
|---|---|---|---|
| 5 | 16.1 | 11.1 | 3.3 |
| 10 | 16.3 | 20.9 | 6.7 |
| 15 | 16.6 | 28.7 | 10.6 |
| 20 | 17.1 | 34.4 | 15.5 |
| 25 | 17.7 | 38.4 | 22.2 |

In some embodiments, referring to FIG. 2B, FIG. 2C, FIG. 39, and FIG. 7, the refracting angle b is away from the respective one of the plurality of reflectors 132 and the respective one of the plurality of reflective gratings 131. The refractive index of the first prism 1331 should be greater than the refractive index of the first planarization layer 151. For example, the refractive index of the first prism 1331 is $n_3$, and the refractive index of the first planarization layer 151 is $n_1$.

Optionally, the refractive index of the second prism 1321 is equivalent to a refractive index of the second protective layer 142, the angle a between the reflecting surface RS of the second prism 1321 and the second side S2 of the light guide plate 11 satisfies a following equation: a=θ/2. If the refractive index of the second prism 1321 is different from the refractive index of the second protective layer 142, the angle a can be calculated based on geometric refraction relationships between incident light and refracted light.

Optionally, the adjusted light $L_A$ is perpendicular to the first surface SF1 on the first side S1 of the light guide plate 11, the refracting angle b of the first prism 1331 should satisfies the equation (3):

$$b = \text{arc}tg\left(\frac{\sin\theta}{\frac{n_1}{n_3} - \cos\theta}\right); \quad (3)$$

Wherein the refractive index of the first protective layer 141 is $n_1$, and the refractive index of the first prism 1331 is $n_3$.

Optionally, the minimum height H of the first prism 1331 for fully covering the reflected light having the respective wavelength range is calculated using the equation (6):

$$H = S^*\sin(\theta+90)/\sin(90-b-\theta)^*\sin(b) \quad (6);$$

Based on the equations (3) to (6), parameters of the first prism 1331 and parameters of second prism 1321 can be determines.

For example, the length P is 16 um, the refractive index of the first protective layer 141 and the refractive index of the first planarization layer 151 are $n_1=1.25$, the refractive index of the first prism 1331 is $n_3=1.8$, the distance q between two adjacent reflective gratings of the plurality of reflective gratings 131 along the third direction D3 is 250 um, a thickness t of the light guide plate 11 is 500 μm.

Based on the equation (2) and the relationships between the angle a and the angle θ, the angle θ is 2°21 θ<25°. Based on different values of the angle θ, the lengths of the portion of the side of the first prism 1331 along the third direction D3, the refracting angle b, the minimum height H of the first prism 1331 can be determined and shown in the follow table 2:

TABLE 2

| θ/° | s/μm | b/° | H/μm |
|---|---|---|---|
| 5 | 16.1 | 11.1 | 3.3 |
| 10 | 16.3 | 20.9 | 6.7 |
| 15 | 16.6 | 28.7 | 10.6 |
| 20 | 17.1 | 34.4 | 15.5 |
| 25 | 17.7 | 38.4 | 22.2 |

In some embodiments, referring to FIG. 2C, FIG. 8, and FIG. 9A, the respective one of the plurality of light direction adjustors 133 includes the reflector micro-assembly (e.g., the plurality of reflecting mirrors 1335).

For example, the included angle u between the reflecting surface of the respective one of the plurality of reflecting mirrors 1335 and the first surface SF1 on the first side S1 of the light guide plate 11 satisfies an equation that $u=90°-θ/2$.

In some embodiments, referring to FIG. 10A, the respective one of the plurality of light direction adjustors 133 includes the transmissive grating 1336, so that the respective one of the plurality of light extracting structure has a double grating structure. Parameters of the transmissive grating 1336 can be determined based on the equation (1).

Examples of appropriate display apparatuses described herein include, but are not limited to, an electronic paper, a mobile phone, a tablet computer, a television, a monitor, a notebook computer, a digital album, a GPS, etc. Optionally, the display apparatus can be used in virtual reality, augmented reality, transparent display, direction display, and color display.

In another aspect, the present disclosure also provides a backlight module in a display apparatus described herein. In some embodiments, referring to FIG. 2C and FIG. 5, the backlight module includes a light guide plate 11; a plurality of reflective gratings 131 and a plurality of light direction adjustors 133 on a first side S1 of the light guide plate 11; a plurality of reflectors 132 on a second side S2 of the light guide plate 11. Optionally, the second side S2 is opposite to the first side S1. Optionally, the first side S1 is configured to allow totally reflected light in the light guide plate 11 to transmit out.

Optionally, a respective one of the plurality of reflective gratings 131 is configured to diffract and reflect a portion of light totally reflected in the light guide plate 11 into diffracted light transmitting across the light guide plate 11 from the first side S1 toward the second side S2. Optionally, a respective one of the plurality of reflectors 132 is configured to receive a portion of the diffracted light, and the portion of the diffracted light has a respective wavelength range.

Optionally, the respective one of the plurality of reflectors is configured to reflect the portion of the diffracted light having the respective wavelength range, to obtain reflected light having the respective wavelength range transmitting across the light guide plate 11 from the second side S2 toward the first side S1 to be received by a respective one of the plurality of light direction adjustors 133.

Optionally, the respective one of the plurality of light direction adjustors 133 is configured to change a first direction D1 of the reflected light having the respective wavelength range, to obtain adjusted light having the respective wavelength range transmitting along a second direction D2 away from the first side S1 of the light guide plate 11.

Optionally, the respective one of the plurality of reflective gratings 131, the respective one of the plurality of reflectors 132, and the respective one of the plurality of light direction adjustors 133 are optically coupled.

In some embodiments, at least a portion of the diffracted light having a wavelength outside the respective wavelength range transmits through the second side S2 of the light guide plate 11 without being reflected by the respective one of the plurality of reflectors 132.'

In some embodiments, referring to FIG. 2A, FIG. 3A and FIG. 5, the orthographic projection of the respective one of the plurality of reflective gratings 131 on the light guide plate 11 at least partially overlaps with the orthographic projection of the respective one of the plurality of reflectors 132 on the light guide plate 11.

In some embodiments, the orthographic projection of the respective one of the plurality of light direction adjustors 133 on the light guide plate 11 is at least partially non-overlapping with an orthographic projection of the respective one of the plurality of reflective gratings 131 on the light guide plate 11.

Referring to FIG. 6, an angle a between a reflecting surface RS of the respective one of the plurality of reflectors 132 that reflects the portion of the diffracted light having the respective wavelength range and the second surface on the second side of the light guide plate satisfies a following equation:

$$\frac{1}{2}\arctan\left(\frac{p}{t}\right) < a < \frac{1}{2}\arctan\left(\frac{q+p}{t}\right);$$

wherein a stands for the angle between the reflecting surface of the respective one of the plurality of reflectors and the second surface on the second side of the light guide plate; P stands for a length, along a third direction along which the plurality of reflective gratings are arranged, of a portion of the respective one of the plurality of reflective gratings having an orthographic projection on the light guide plate overlapping with the orthographic projection of the respective one of the plurality of reflectors on the light guide plate; q stands for a distance between two adjacent reflective gratings of the plurality of reflective gratings along the third direction; and t stands for a thickness of the light guide plate.

In some embodiments, referring to FIG. 6 to FIG. 10B, the respective one of the plurality of light direction adjustors 133 includes an element selected from a group consisting of a prism, a reflector micro-assembly 1334 including a plurality of reflecting mirrors 1335, and a transmissive grating 1336.

Optionally, referring to FIG. 2C and FIG. 8, the respective one of the plurality of light direction adjustors 133 includes the plurality of reflecting mirrors 1335. Optionally, the plurality of reflecting mirrors 1335 is arranged along a fourth direction D4. Optionally, a reflecting surface of a respective one of the plurality of reflecting mirrors 1335 and the first surface SF1 on the first side S1 of the light guide plate 11 forms an included angle greater than zero. Optionally, the fourth direction D4 is parallel to the first surface SF1 on the first side S1 of the light guide plate 11 and intersecting reflective surfaces of the plurality of reflecting mirrors 1335.

In some embodiments, a period of the respective one of the plurality of reflective gratings is calculated by a following equation:

$$n_i \sin \theta_i - n_d \sin \theta_d = m\lambda/\Lambda;$$

wherein $n_i$ stands for a refractive index of a material of the light guide plate through which an incident light transmits; $\theta_i$ stands for an incident angle of the incident light; $n_d$ stands for a refractive index of the material of the light guide plate through which the diffracted light diffracted by the respective one of the plurality of reflective gratings transmits; $\theta_d$ stands for a diffraction angle of the diffracted light; m stands for a diffraction order; $\lambda$ stands for a respective wavelength range of light diffracted by the respective one of the plurality of reflective gratings; and $\Lambda$ represents the period of the respective one of the plurality of reflective gratings.

In some embodiments, referring to FIG. 6, the angle a between the reflecting surface RS of the respective one of the plurality of reflectors 132 and the second surface SF2 on the second side S2 of the light guide plate 11 is in a range of 1 degree to 12.5 degrees.

In some embodiments, referring to FIG. 6 to FIG. 10B, a respective one of the plurality of reflectors 132 includes an elements selected from a group consisting of a prism, a reflector micro-assembly including a plurality of reflecting mirrors, and a transmissive grating. Optionally, referring to FIG. 6, the respective one of the plurality of reflectors 132 includes the prism 1321; and a reflecting layer 1322 is on a side of the prism away from the light guide plate 11 (e.g., the reflecting surface RS of the respective one of the plurality of reflectors 132). Optionally, referring to FIG. 9B, the respective one of the plurality of reflectors 132 includes the plurality of reflecting mirrors. Optionally, the plurality of reflecting mirrors is arranged along a fifth direction D5. Optionally, a reflecting surface of a respective one of the plurality of reflecting mirrors and the second surface SF2 on the second side S2 of the light guide plate 11 form an include angle. Optionally, the fifth direction D5 is parallel to the second surface SF2 on the second side S2 of the light guide plate 11 and intersecting reflective surfaces of the plurality of reflecting mirrors.

In some embodiments, referring to FIG. 2C and FIG. 5, the backlight module further includes a first protective layer 141 on the first side S1 of the light guide plate 11; and a second protective layer 142 on the second side S1 of the light guide plate 11. Optionally, a refractive index of the light guide plate 11 is greater than a refractive index of the first protective layer 141 and a refractive index of the second protective layer 142.

In some embodiments, the backlight module further includes a first planarization layer 151 on a side of the plurality of light direction adjustors 133 away from the light guide plate 11; and a second planarization layer 152 on a side of the plurality of reflectors 132 away from the light guide plate 11.

In some embodiments, the backlight module further includes a light source 12 on a lateral side S3 of the light guide plate 11. Optionally, the lateral side connects the first surface SF1 on the first side S1 and the second surface SF2 on the second side S2 of the light guide plate 11. Optionally, the backlight module further includes a color filter 122 between the light source 12 and the lateral side S3 of the light guide plate 11. Optionally, the color filter 122 includes a plurality of color filter blocks respectively configured to filter light emitted from the light source into lights of selected wavelength ranges, respectively.

In some embodiments, the backlight module further includes a reflecting cap 16 configured to reflect light from the light emitting element to the light guide plate 11. Optionally, the reflecting cap 16 and the light guide plate 11 are optically coupled.

In some embodiments, the backlight module and the display apparatus described herein have the plurality of light extracting structures described herein. The respective one of the plurality of light extracting structures can extract light having the respective wavelength range out of the first side of the light guide plate and control the direction of the light extracted from the light guide plate. Therefore, different light extracting structures respectively extract different light having different wavelength ranges, which allow the display apparatus to perform color display, and the light outside the range of the respective ranges are transmit out from the second side of the light guide plate. Optionally, the plurality of subpixel regions can be absent of color filters, which can decrease a thickness of the display apparatus, and at the same time improve the light transmittance of the display apparatus.

In another aspect, the present disclosure also provides a method of displaying an image using the display apparatus described herein. In some embodiments, the method of displaying the image includes diffracting and reflecting a portion of light totally reflected in a light guide plate using a respective one of a plurality of reflective gratings on a first side of the light guide plate to obtain diffracted light transmitting across the light guide plate from the first side of the light guide plate toward a second side of a light guide plate opposite to the first side; receiving a portion of the diffracted light, the portion having a respective wavelength range, using a respective one of the plurality of reflectors on a second side of the light guide plate; reflecting the portion of the diffracted light having the respective wavelength range using the respective one of the plurality of reflectors to obtain reflected light having the respective wavelength range transmitting across the light guide plate from the second side toward the first side; receiving the reflected light having the respective wavelength range using a respective one of a plurality of light direction adjustors on the first side of the light guide plate; changing a first direction of the reflected light having the respective wavelength range using the respective one of the plurality of light direction adjustors to obtain adjusted light having the respective wavelength range transmitting along a second direction toward a respective one of a plurality of black matrix blocks on the first side of the light guide plate.

Optionally, an array substrate is on a side of the plurality of reflective gratings and the plurality of light direction adjustors away from the light guide plate. Optionally, a liquid crystal layer is on a side of the array substrate away from the light guide plate. Optionally, a counter substrate is on a side of the liquid crystal layer away from the array substrate, and includes a first black matrix which includes the plurality of black matrix blocks spaced apart from each other, a respective one of the plurality of black matrix blocks in a respective one of a plurality of subpixel regions. Optionally, an orthographic projection of the respective one of the plurality of black matrix blocks on the light guide plate at least partially overlaps with an orthographic projection of the respective one of the plurality of light direction adjustors on the light guide plate.

Optionally, the respective one of the plurality of reflective gratings, the respective one of the plurality of reflectors, the respective one of the plurality of light direction adjustors, and the respective one of the plurality of black matrix blocks are optically coupled.

Optionally, the method further includes extracting light totally reflected in the light guide plate from the first side of the light guide plate.

In some embodiments, the orthographic projection of the respective one of the plurality of black matrix blocks on the light guide plate is at least partially non-overlapping with an orthographic projection of the respective one of the plurality of reflective gratings on the light guide plate.

In some embodiments, the orthographic projection of the respective one of the plurality of black matrix blocks on the light guide plate is at least partially non-overlapping with an orthographic projection of the respective one of the plurality of reflectors on the light guide plate.

In some embodiments, the method further includes operating the liquid crystal layer in a respective one of the plurality of subpixel regions in a dark state and a bright state. Optionally, operating the liquid crystal layer in the dark state includes applying a first voltage to the liquid crystal layer in the respective one of the plurality of subpixel regions; and substantially blocking the adjusted light using the respective one of the plurality of black matrix blocks. Optionally, operating the liquid crystal layer in the bright state includes applying a second voltage to the liquid crystal layer in the respective one of the plurality of subpixel regions; forming a liquid crystal grating having a plurality of liquid crystal lenses; and refracting at least a portion of the adjusted light to transmit out of the counter substrate using the plurality of liquid crystal lenses.

In some embodiments, the method further includes transmitting at least a portion of the diffracted light having a wavelength outside the respective wavelength range through the second side of the light guide plate without reflecting the at least the portion of the diffracted light having the wavelength outside the respective wavelength range using the respective one of the plurality of reflectors.

In some embodiments, the orthographic projection of the respective one of the plurality of reflective gratings on the light guide plate at least partially overlaps with the orthographic projection of the respective one of the plurality of reflectors on the light guide plate.

In some embodiments, the orthographic projection of the respective one of the plurality of light direction adjustors on the light guide plate is at least partially non-overlapping with an orthographic projection of the respective one of the plurality of reflective gratings on the light guide plate.

Optionally, an angle a between a reflecting surface of the respective one of the plurality of reflectors that reflects the portion of the diffracted light having the respective wavelength range and the second surface on the second side of the light guide plate satisfies a following equation:

$$\frac{1}{2}\arctan\left(\frac{P}{t}\right) < a < \frac{1}{2}\arctan\left(\frac{q+P}{t}\right);$$

wherein a stands for the angle between the reflecting surface of the respective one of the plurality of reflectors and a second surface on the second side of the light guide plate; P stands for a length, along a third direction along which the plurality of reflective gratings are arranged, of a portion of the respective one of the plurality of reflective gratings having an orthographic projection on the light guide plate overlapping with the orthographic projection of the respective one of the plurality of reflectors on the light guide plate; q stands for a distance between two adjacent reflective gratings of the plurality of reflective gratings along the third direction; and t stands for a thickness of the light guide plate.

Optionally, the angle a between the reflecting surface of the respective one of the plurality of reflectors and the second surface on the second side of the light guide plate is in a range of 1 degree to 12.5 degrees.

In some embodiments, the respective one of the plurality of light direction adjustors includes an element selected from a group consisting of a prism, a reflector micro-assembly including a plurality of reflecting mirrors, and a transmissive grating.

In some embodiments, the respective one of the plurality of light direction adjustors includes the plurality of reflecting mirrors. Optionally, the plurality of reflecting mirrors is arranged along a fourth direction. Optionally, a reflecting surface of a respective one of the plurality of reflecting mirrors and the first surface on the first side of the light guide plate forms an included angle greater than zero. Optionally, the fourth direction is parallel to the first surface on the first side of the light guide plate and intersecting reflective surfaces of the plurality of reflecting mirrors.

In some embodiments, a period of the respective one of e of reflective gratings is calculated by a following equation:

$$n_i \sin\theta_i - n_d \sin\theta_d = m\lambda/\Lambda;$$

wherein $n_i$ stands for a refractive index of a material of the light guide plate through which an incident light transmits; $\theta_i$ stands for an incident angle of the incident light; $n_d$ stands for a refractive index of the material of the light guide plate through which the diffracted light diffracted by the respective one of the plurality of reflective gratings transmits; $\theta_d$ stands for a diffraction angle of the diffracted light; m stands for a diffraction order; λ stands for a respective wavelength range of light diffracted by the respective one of the plurality of reflective gratings; and Λ represents the period of the respective one of the plurality of reflective gratings.

In some embodiments, a respective one of the plurality of reflectors includes an elements selected from a group consisting of a prism, a reflector micro-assembly including a plurality of reflecting mirrors, and a transmissive grating. Optionally, the respective one of the plurality of reflectors includes the prism; and a reflecting layer is on a side of the prism away from the light guide plate.

In some embodiments, the respective one of the plurality of reflectors includes the plurality of reflecting mirrors. Optionally, the plurality of reflecting mirrors is arranged along a fifth direction. Optionally, a reflecting surface of a respective one of the plurality of reflecting mirrors and the second surface on the second side of the light guide plate form an include angle. Optionally, the fifth direction is parallel to the second surface on the second side of the light guide plate and intersecting reflective surfaces of the plurality of reflecting mirrors.

In some embodiments, a first protective layer is on the first side of the light guide plate; and a second protective layer is on the second side of the light guide plate. Optionally, a refractive index of the light guide plate is greater than a refractive index of the first protective layer and a refractive index of the second protective layer.

In some embodiments, a first planarization layer is on a side of the plurality of light direction adjustors away from the light guide plate; and a second planarization layer on a side of the plurality of reflectors away from the light guide plate.

In some embodiments, the method further includes filtering light emitted from a light source into lights of selected wavelength ranges, respectively using a plurality of color filter blocks between the light source and a lateral side of the light guide plate. Optionally, the light source is on the lateral side of the light guide plate. Optionally, the lateral side connects the first surface on the first side and the second surface on the second side of the light guide plate. Optionally, a color filter is between the light source and the lateral side of the light guide plate. Optionally, the color filter includes the plurality of color filter blocks.

In some embodiments, the method further includes reflecting light from the light emitting element to the light guide plate using the reflecting cap.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus having a plurality of subpixel regions, comprising:
a backlight module;
wherein the backlight module comprises:
a light guide plate;
a plurality of reflective gratings on a first side of the light guide plate; and
a plurality of reflectors on a second side of the light guide plate, wherein the second side is opposite to the first side;
wherein a respective one of the plurality of reflective gratings is configured to diffract and reflect a portion of light totally reflected in the light guide plate into diffracted light transmitting across the light guide plate from the first side toward the second side, a portion of the diffracted light having a respective wavelength range to be received by a respective one of the plurality of reflectors; and
the respective one of the plurality of reflectors is configured to reflect the portion of the diffracted light having the respective wavelength range transmitting across the light guide plate from the second side toward the first side to a position between the respective one of the plurality of reflective gratings and an adjacent reflective grating of the plurality of reflective gratings;
wherein the display apparatus further comprises:
a plurality of light direction adjustors on the first side of the light guide plate;
an array substrate on a side of the plurality of reflective gratings and the plurality of light direction adjustors away from the light guide plate;
a liquid crystal layer on a side of the array substrate away from the light guide plate; and
a counter substrate on a side of the liquid crystal layer away from the array substrate, and comprising a first black matrix which comprises a plurality of black matrix blocks spaced apart from each other, a respective one of the plurality of black matrix blocks in a respective one of the plurality of subpixel regions;
wherein a reflected light from the respective one of the plurality of reflectors having the respective wavelength range transmitting across the light guide plate from the second side toward the first side is configured to be received by a respective one of the plurality of light direction adjustors;
the respective one of the plurality of light direction adjustors is configured to change a first direction of the reflected light having the respective wavelength range, to obtain adjusted light having the respective wavelength range transmitting along a second direction toward a respective one of the plurality of black matrix blocks; and
an orthographic projection of the respective one of the plurality of black matrix blocks on the light guide plate at least partially overlaps with an orthographic projection of the respective one of the plurality of light direction adjustors on the light guide plate.

2. The display apparatus of claim 1, wherein the orthographic projection of the respective one of the plurality of black matrix blocks on the light guide plate is at least partially non-overlapping with an orthographic projection of the respective one of the plurality of reflective gratings on the light guide plate.

3. The display apparatus of claim 1, wherein the orthographic projection of the respective one of the plurality of black matrix blocks on the light guide plate is at least partially non-overlapping with an orthographic projection of the respective one of the plurality of reflectors on the light guide plate.

4. The display apparatus of claim 1, wherein the plurality of light direction adjustors are between the light guide plate and the array substrate; and
a respective one of the plurality of light direction adjustors is between the respective one of the plurality of reflective gratings and the adjacent reflective grating of the plurality of reflective gratings.

5. The display apparatus of claim 1, wherein the plurality of light direction adjustors are attached on a base substrate of the array substrate.

6. The display apparatus of claim 1, wherein an orthographic projection of the respective one of the plurality of reflective gratings on the light guide plate at least partially overlaps with an orthographic projection of the respective one of the plurality of reflectors on the light guide plate.

7. The display apparatus of claim 6, wherein an angle between a reflecting surface of the respective one of the plurality of reflectors that reflects the portion of the diffracted light having the respective wavelength range and a second surface on the second side of the light guide plate satisfies a following equation:

$$\frac{1}{2}\arctan\left(\frac{p}{t}\right) < a < \frac{1}{2}\arctan\left(\frac{q+p}{t}\right);$$

wherein a stands for the angle between the reflecting surface of the respective one of the plurality of reflectors and the second surface on the second side of the light guide plate; p stands for a length, along a third direction along which the plurality of reflective gratings are arranged, of a portion of the respective one of the plurality of reflective gratings having an orthographic projection on the light guide plate overlapping with the orthographic projection of the respective one of the plurality of reflectors on the light guide plate; q stands for a distance between two adjacent reflective gratings of the plurality of reflective gratings along the third direction; and t stands for a thickness of the light guide plate.

8. The display apparatus of claim 1, further comprising a plurality of light direction adjustors on the first side of the light guide plate;
wherein the respective one of the plurality of reflectors is configured to reflect the portion of the diffracted light, and to obtain reflected light having the respective wavelength range transmitting across the light guide plate from the second side toward the first side to be received by a respective one of the plurality of light direction adjustors; and
the respective one of the plurality of light direction adjustors is configured to change a first direction of the reflected light having the respective wavelength range, and to obtain adjusted light having the respective wavelength range transmitting along a second direction away from the first side of the light guide plate.

9. The display apparatus of claim 8, wherein an orthographic projection of the respective one of the plurality of light direction adjustors on the light guide plate is between an orthographic projection of the respective one of the plurality of reflective gratings on the light guide plate and an orthographic projection of the adjacent reflective grating of the plurality of reflective gratings on the light guide plate.

10. The display apparatus of claim 8, wherein the respective one of the plurality of light direction adjustors comprises an element selected from a group consisting of a prism, a transmissive grating, and a reflector micro-assembly; and
wherein the reflector micro-assembly comprises a plurality of reflecting mirrors.

11. The display apparatus of claim 10, wherein the prism comprises a triangular prism.

12. The display apparatus of claim 10, wherein the respective one of the plurality of light direction adjustors comprises the plurality of reflecting mirrors;
wherein the plurality of reflecting mirrors is arranged along a fourth direction;
a reflecting surface of a respective one of the plurality of reflecting mirrors and a first surface on the first side of the light guide plate form an included angle greater than zero; and
the fourth direction is parallel to the first surface of the first side of the light guide plate and intersecting reflective surfaces of the plurality of reflecting mirrors.

13. The display apparatus of claim 1, wherein a period of the respective one of the plurality of reflective gratings is calculated by a following equation:

$$n_i \sin \theta_i - n_d \sin \theta_d = m\lambda/\Lambda;$$

wherein $n_i$ stands for a refractive index of a material of the light guide plate through which an incident light transmits; $\theta_i$ stands for an incident angle of the incident light; $n_d$ stands for a refractive index of the material of the light guide plate through which the diffracted light diffracted by the respective one of the plurality of reflective gratings transmits; $\theta_d$ stands for a diffraction angle of the diffracted light; m stands for a diffraction order; $\lambda$ stands for a respective wavelength range of light diffracted by the respective one of the plurality of reflective gratings; and $\Lambda$ represents the period of the respective one of the plurality of reflective gratings.

14. The display apparatus of claim 1, wherein the respective one of the plurality of reflectors comprises an elements selected from a group consisting of a prism, a transmissive grating, and a reflector micro-assembly;
wherein the reflector micro-assembly comprises a plurality of reflecting mirrors.

15. The display apparatus of claim 14, wherein the respective one of the plurality of reflectors comprises a triangular prism.

16. The display apparatus of claim 14, wherein the respective one of the plurality of reflectors comprises the plurality of reflecting mirrors;
the plurality of reflecting mirrors is arranged along a fifth direction;
a reflecting surface of a respective one of the plurality of reflecting mirrors and a second surface on the second side of the light guide plate form an include angle; and
the fifth direction is parallel to the second surface on the second side of the light guide plate and intersecting reflective surfaces of the plurality of reflecting mirrors.

17. The display apparatus of claim 1, further comprising:
a light source on a lateral side of the light guide plate, wherein the lateral side of the light guide plate is connected to a first surface on the first side of the light guide plate and a second surface on the second side of the light guide plate; and
a color filter between the light source and the lateral side of the light guide plate, wherein the color filter comprises a plurality of color filter blocks respectively configured to filter light emitted from the light source into lights of selected wavelength ranges, respectively.

18. The display apparatus of claim 1, further comprising a light source on a lateral side of the light guide plate, wherein the lateral side of the light guide plate is connected to a first surface on the first side of the light guide plate and a second surface on the second side of the light guide plate;
wherein the light source comprises a light emitting element of a first color, a light emitting element of a second color, and a light emitting element of a third color.

19. A method of displaying an image, comprising:
diffracting and reflecting a portion of light totally reflected in a light guide plate using a respective one of a plurality of reflective gratings on a first side of the light guide plate to obtain diffracted light transmitting across the light guide plate from the first side of the light guide plate toward a second side of a light guide plate opposite to the first side;
receiving a portion of the diffracted light, the portion having a respective wavelength range, using a respective one of a plurality of reflectors on the second side of the light guide plate;
reflecting the portion of the diffracted light having the respective wavelength range using the respective one of the plurality of reflectors to obtain reflected light having the respective wavelength range transmitting across the light guide plate from the second side toward the first side;
receiving the reflected light having the respective wavelength range using a respective one of a plurality of light direction adjustors on the first side of the light guide plate; and
changing a first direction of the reflected light having the respective wavelength range using the respective one of the plurality of light direction adjustors to obtain adjusted light having the respective wavelength range transmitting along a second direction toward a respective one of a plurality of black matrix blocks on the first side of the light guide plate;
wherein an array substrate is on a side of the plurality of reflective gratings and the plurality of light direction adjustors away from the light guide plate;
a liquid crystal layer is on a side of the array substrate away from the light guide plate;
a counter substrate is on a side of the liquid crystal layer away from the array substrate, and comprises a first black matrix which comprises the plurality of black matrix blocks spaced apart from each other, a respective one of the plurality of black matrix blocks in a respective one of a plurality of subpixel regions; and
an orthographic projection of the respective one of the plurality of black matrix blocks on the light guide plate at least partially overlaps with an orthographic projection of the respective one of the plurality of light direction adjustors on the light guide plate.

* * * * *